United States Patent
Hirooka et al.

(10) Patent No.: US 9,712,724 B2
(45) Date of Patent: Jul. 18, 2017

(54) IMAGE SIGNAL PROCESSING APPARATUS, IMAGING APPARATUS AND IMAGE PROCESSING PROGRAM FOR PERFORMING IMAGE AND NOISE CORRECTION

(71) Applicant: HITACHI INDUSTRY & CONTROL SOLUTIONS, LTD., Ibaraki (JP)

(72) Inventors: Shinichiro Hirooka, Fujisawa (JP); Hirotomo Sai, Yokohama (JP); Junji Shiokawa, Chigasaki (JP)

(73) Assignee: HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 13/758,279

(22) Filed: Feb. 4, 2013

(65) Prior Publication Data
US 2013/0201401 A1     Aug. 8, 2013

(30) Foreign Application Priority Data
Feb. 8, 2012   (JP) ................................. 2012-024656

(51) Int. Cl.
*H04N 5/228*   (2006.01)
*G06K 9/00*    (2006.01)
(Continued)

(52) U.S. Cl.
CPC ............. *H04N 5/21* (2013.01); *H04N 5/2173* (2013.01); *H04N 5/243* (2013.01); *H04N 5/357* (2013.01)

(58) Field of Classification Search
CPC ............... H04N 5/2329; H04N 17/002; H04N 19/00278; H04N 19/00533;
(Continued)

(56) References Cited

U.S. PATENT DOCUMENTS 7,843,498 B2   11/2010  Takahashi et al.
8,184,924 B2    5/2012  Tsuruoka
(Continued)

FOREIGN PATENT DOCUMENTS

EP   2690860 A1    1/2014
JP   2005-210442 A  8/2005
(Continued)

OTHER PUBLICATIONS

Extended European Search Report, mailed May 11, 2015, which issued during the prosecution of European Application No. 13000603.4, which corresponds to the present application.
(Continued)

*Primary Examiner* — Twyler Haskins
*Assistant Examiner* — Carramah J Quiett
(74) *Attorney, Agent, or Firm* — Baker Botts L.L.P.

(57) ABSTRACT

An image signal processing apparatus includes an image signal input unit for inputting an image signal, a noise correcting unit for executing noise correction processing for the input image signal to output a noise-corrected image signal; an image signal correcting unit for executing signal level correction processing for the noise-corrected image signal to output a signal level-corrected image signal; an image signal correction intensity control unit for determining correction intensity of the signal level correction processing in the image signal correcting unit; a signal extension estimating unit for estimating a signal extension degree of signal extension based on the determined correction intensity; and a noise correction intensity control unit for calculating and controlling correction intensity of the noise correction processing in the noise correcting unit.

32 Claims, 26 Drawing Sheets

(51) Int. Cl.
*G06K 9/40* (2006.01)
*H04N 5/21* (2006.01)
*H04N 5/217* (2011.01)
*H04N 5/357* (2011.01)
*H04N 5/243* (2006.01)

(58) Field of Classification Search
CPC ........... H04N 19/00951; H04N 5/2256; H04N 5/232; H04N 5/23212; H04N 5/2352; H04N 5/2353; H04N 5/33; H04N 5/335; H04N 13/0022
See application file for complete search history.

(56) References Cited

U.S. PATENT DOCUMENTS

| | | |
|---|---|---|
| 2008/0284880 A1 | 11/2008 | Numata |
| 2008/0292202 A1 | 11/2008 | Vakrat |
| 2010/0329553 A1* | 12/2010 | Shiokawa et al. ............ 382/167 |
| 2011/0019035 A1 | 1/2011 | Satodate |

FOREIGN PATENT DOCUMENTS

| | | |
|---|---|---|
| JP | 2010-278937 | 12/2010 |
| WO | WO 2006/120864 A1 | 11/2006 |

OTHER PUBLICATIONS

Office Action, mailed Oct. 6, 2015, which issued during the prosecution of Japanese Patent Application No. 2012-024656, which corresponds to the present application.

Communication pursuant to Article 94(3) EPC, mailed Feb. 13, 2017, which issued during the prosecution of European Patent Application No. 13 000 603.4, which corresponds to the present application.

* cited by examiner

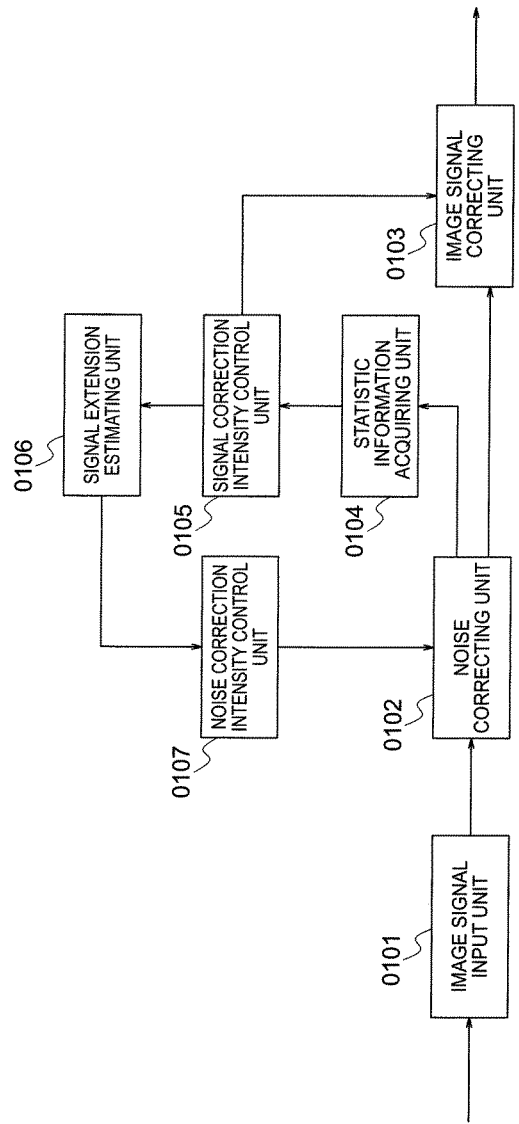

FIG. 2A
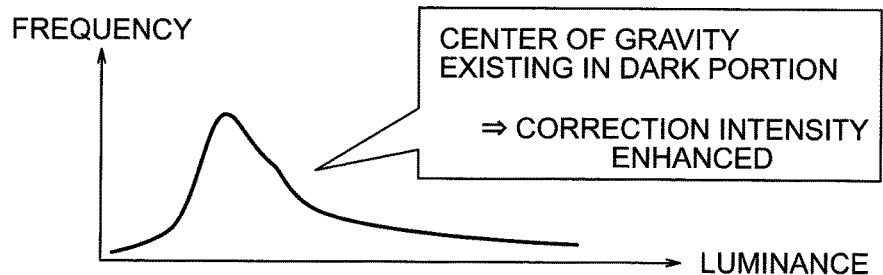
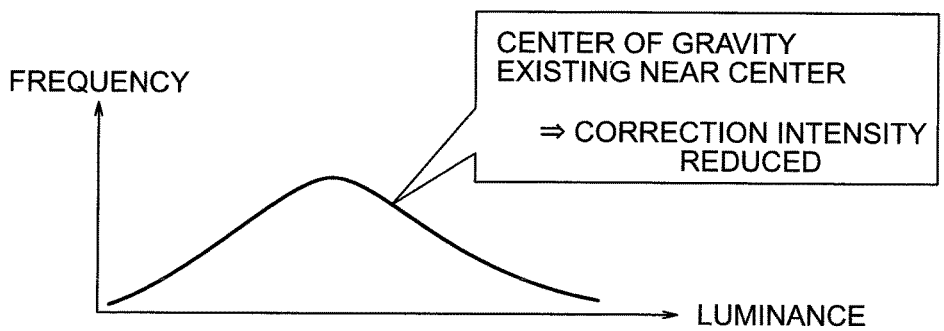
FIG. 2B
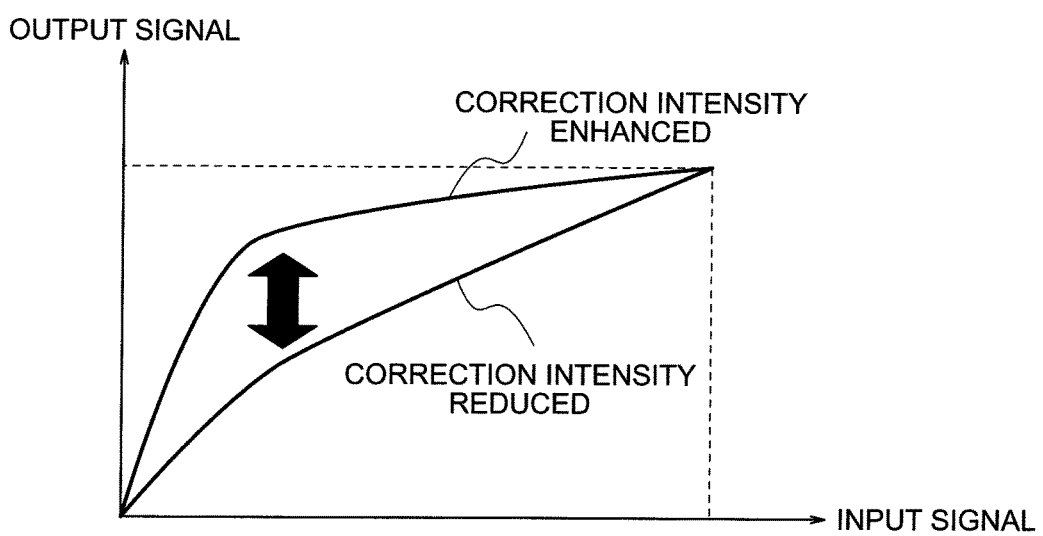

FIG. 3A
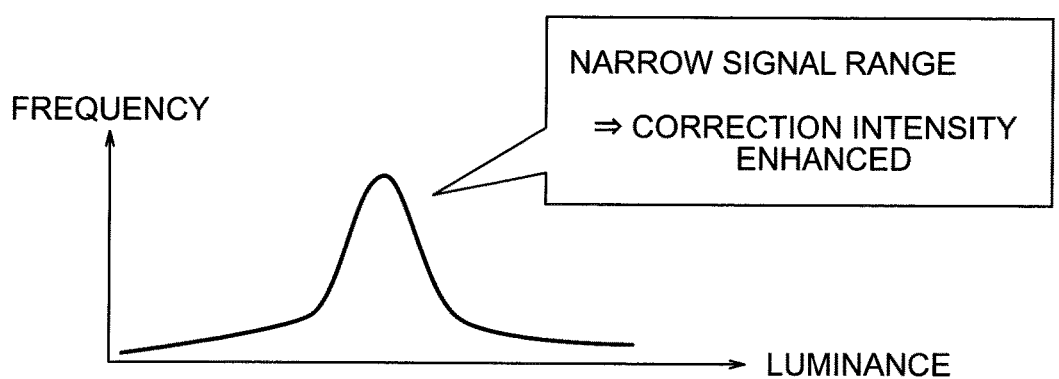
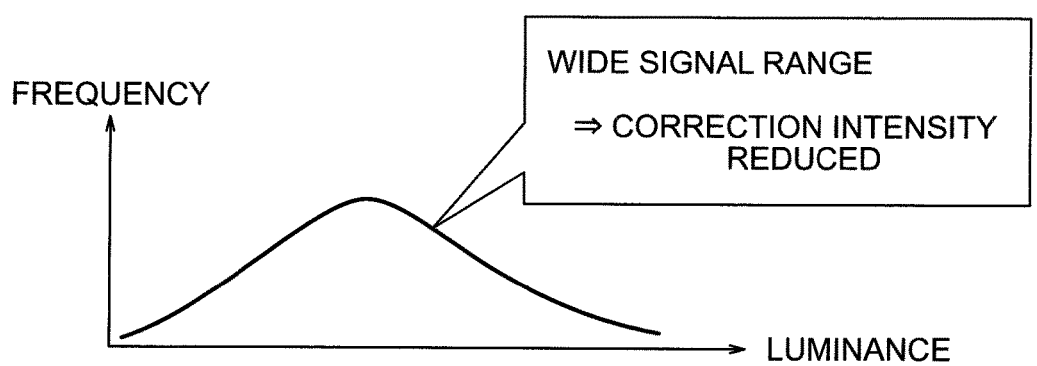

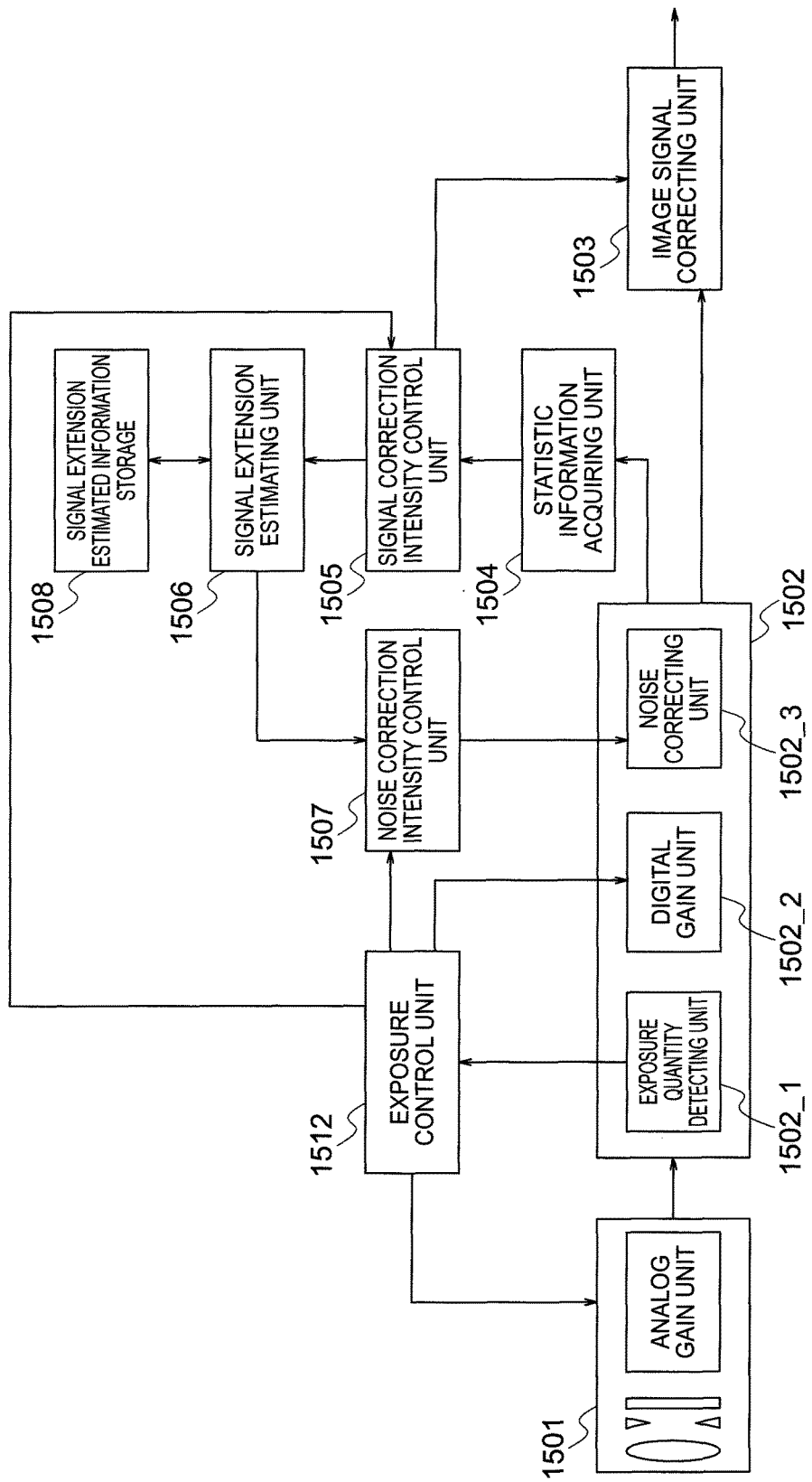

IMAGE SIGNAL PROCESSING APPARATUS, IMAGING APPARATUS AND IMAGE PROCESSING PROGRAM FOR PERFORMING IMAGE AND NOISE CORRECTION

INCORPORATION BY REFERENCE

The present application claims priority from Japanese application JP 2012-024656 filed on Feb. 8, 2012, the content of which is hereby incorporated by reference into this application.

BACKGROUND OF THE INVENTION

The present invention relates to an image signal processing apparatus, an imaging apparatus, and an image processing program, for example, to an image signal processing apparatus to conduct a noise correction and various image corrections to change signal levels.

The background of the present technique is, for example, JP-A-2010-278937. According to the technique described in JP-A-2010-278937, the object thereof is to achieve high contrast in low-luminance and high-luminance portions while suppressing noise in the luminance portion and to achieve high contrast in feature portions of an image. Further, an image signal processing apparatus includes first region input/output characteristic control means 3 for controlling variation in input/output characteristics for each optional region while being interlocked with a value of an input luminance signal, first region luminance signal correcting means 1 for varying input/output characteristics of a luminance signal in accordance with output of the first region input/output characteristic control means, second region input/output characteristic correcting means 2 for controlling variation in input/output characteristics for each optional region while being interlocked with output of the first region luminance signal correcting means, second region luminance signal correcting means 2 for varying input/output characteristics of a luminance signal in accordance with output of the second region input/output characteristic control means, color signal input/output characteristic control means 5 for controlling variation in input/output characteristics of an input color signal by utilizing the output of the first region input/output characteristic control means and the output of the second region input/output characteristic control means, and color signal correcting means 6 for varying input/output characteristics of a color signal in accordance with output of the color signal input/output characteristic control means.

SUMMARY OF THE INVENTION

Recently, an image correcting function to improve visibility of various scenes has been increasingly put to practices. The image correcting function conducts, for example, signal extension and gradation correction in the image processing by referring to a histogram of substantially all regions of an input image or each region of the input image. The image correcting function includes, for example, a backlight correcting function, a fog and haze correcting function, and a wide dynamic range function and is adopted in a camera for consumers, a monitor camera, and the like.

JP-A-2010-278937 describes a technique to improve contrast in an image. However, by extending a signal, a noise component inherently existing in an input image is also emphasized together with the contrast. Nevertheless, JP-A-2010-278937 makes no reference to the noise associated with the contrast correction.

It is therefore an object of the present invention to provide an image signal processing apparatus, an imaging apparatus, and an image processing program which remove the problem above and which are capable of creating an image signal having high picture quality by appropriately suppressing noise at low cost.

Representative inventions disclosed by the present application will be simply described as below.

There is provided, for example, an image signal processing apparatus which controls, at image correction to correct a signal level of an image signal, correction intensity in a noise correction according to correction intensity of the image correction. Hence, it possible to suppress emphasis of the noise, and picture quality is improved. Also, there is provided an image signal processing apparatus which estimates an extension ratio of a signal through image correction processing based on correction intensity in image correction processing and input/output characteristics of the image correction processing as a reference, to control correction intensity of a noise correction in association with a result of the estimation. Hence, it is possible to control the correction intensity of the noise correction by use of control software, which advantageously results in cost reduction.

In accordance with the present invention, there is provided an image signal processing apparatus including an image signal input unit for inputting an image signal, a noise correcting unit for executing noise correction processing for the image signal inputted from the image signal input unit, to output a noise-corrected image signal in which noise is corrected; an image signal correcting unit for executing signal level correction processing for the image signal outputted from the noise correcting unit, to output an image signal in which a signal level is corrected; an image signal correction intensity control unit for determining correction intensity of the signal level correction processing in the image signal correcting unit, to change an input/output characteristic of the signal level correction processing; a signal extension estimating unit for estimating a signal extension degree of signal extension due to the signal level correction processing in the image signal correcting unit based on the correction intensity determined by the image signal correction intensity control unit; and a noise correction intensity control unit for calculating and controlling correction intensity of the noise correction processing in the noise correcting unit in association with the signal extension degree estimated by the signal extension estimating unit.

In accordance with the present invention, there is provided an imaging apparatus including an imaging unit for outputting an image signal obtained by imaging a subject and an image signal processing unit for executing, for the image signal from the imaging unit, noise correction processing by use of correction intensity controlled according to correction intensity of signal level correction processing of the image signal, wherein the image signal processing unit controls the correction intensity of the noise correction processing in association with a signal extension degree due to the signal level correction processing estimated based on the correction intensity of the signal level correction processing.

In accordance with the present invention, it is possible to provide an image signal processing apparatus, an imaging apparatus, and an image processing program capable of creating, at a low cost, an image signal having high picture quality in which noise is appropriately suppressed according to effect of image correction.

Other objects, features and advantages of the invention will become apparent from the following description of the embodiments of the invention taken in conjunction with the accompanying drawings.

BRIEF DESCRIPTION OF THE DRAWINGS

FIG. 1 is a first schematic diagram showing an image signal processing apparatus according to a first embodiment of the present invention;

FIG. 2A is a first diagram graphically showing an example of a correction intensity control method of correcting a signal level by use of statistic information according to the first embodiment;

FIG. 2B is a first diagram showing an example of a correction intensity control method according to the first embodiment;

FIG. 3A is a second diagram graphically showing an example of a correction intensity control method of correcting a signal level by use of statistic information according to the first embodiment;

FIG. 15 is a schematic diagram showing an image signal processing apparatus according to a fourth embodiment of the present invention;

DESCRIPTION OF THE EMBODIMENTS

Figure 3B:
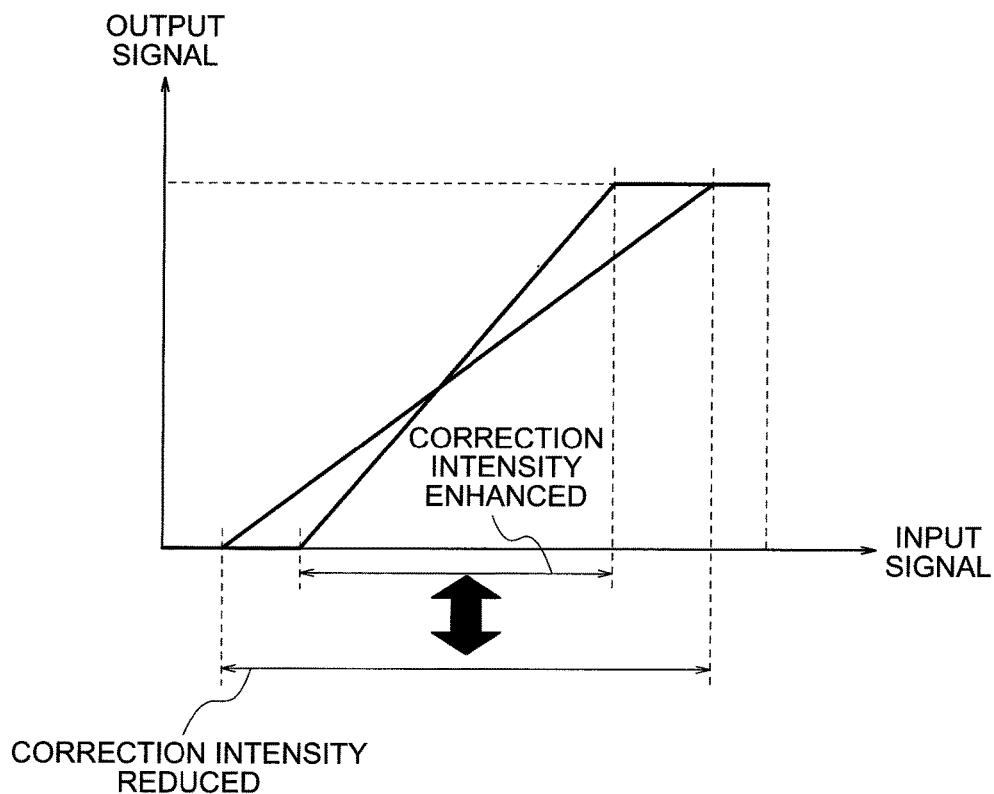
FIG. 3B is a second diagram showing an example of a correction intensity control method according to the first embodiment.

Next, description will be given of embodiments of the present invention by referring to the drawings.

Embodiment 1

FIG. 1 is a first schematic diagram showing an image signal processing apparatus according to a first embodiment of the present invention. The apparatus of FIG. 1 includes an image signal input unit 0101, a noise correcting unit 0102, an image signal correcting unit 0103, a statistic information acquiring unit 0104, a signal correction intensity control unit 0105, a signal extension estimating unit 0106, and a noise correction intensity control unit 0107.

In the image signal processing apparatus shown in FIG. 1, the image signal input unit 0101 connects to imaging equipment or video equipment via a capture board, a Local Area Network (LAN), a Universal Serial Bus (USB), or the like connected to a video cable, to receive an image signal. Or, the image signal input unit 0101 may include a lens, an imaging element, and an Analog-to-Digital (A/D) converter to carry out imaging processing, to thereby produce an image signal. Or, although not shown, there may be employed an image recording unit having stored an image signal in advance such that the image signal is read therefrom for an actual operation.

The noise correcting unit 0102 receives an image signal from the image signal input unit 0101, to execute signal processing for the image signal. The signal processing includes, for example, two-dimensional noise correction processing by use of a smoothing filter such as a Gaussian filter and/or a spatial filter, for example, a median filter to remove a noise component and three-dimensional noise correction processing to correct, when the image signal from the noise correcting unit 0102 is a signal of a mobile image, random noise by calculating the weighted mean of the signal level in the time-axis direction. As a result, the noise correcting unit 0102 creates an image signal in which noise is corrected and then outputs the image signal therefrom. In this regard, the noise correcting unit 0102 may be configured such that two-dimensional noise correction processing of different characteristics and/or three-dimensional noise correction processing of different characteristics are combined with each other in a multistage and/or different processing is concurrently executed for one and the same input signal and then resultant signals are combined with each other, to thereby remove noise components of different characteristics from the input signal. It is also possible that the image signal to be inputted is separated through preprocessing into a low-frequency component and a high-frequency component. Mutually different noise correction processings are executed for the respective components, to effectively remove only noise therefrom with minuteness of the edge kept retained.

The image signal correcting unit 0103 determines an input/output characteristic of the image signal based on correction intensity of the signal level correction outputted from the signal correction intensity control unit 0105 and corrects, based on the input/output characteristic, a signal level as the signal value of each pixel of the image signal inputted from the noise correcting unit 0102, to thereby create an output signal. The image signal correction conducted by the image signal correcting unit 0103 includes backlight correction, fog and haze correction, and wide dynamic range processing implemented by correcting the signal level, which are realized as below. For example, a correspondence between input values and output values is beforehand kept as coefficients of a function or a lookup table. Based on the correction intensity of signal level correction, the values of the coefficients of a function or the lookup table are corrected to determine the input/output characteristic. Based on the input/output characteristic, the signal level of the image signal is converted. It is also possible to beforehand keep a plurality of sets of coefficients of a function or correspondence lookup tables for the corrections corresponding to a plurality of correction intensity values. In operation, based on the correction intensity outputted from the signal correction intensity control unit 0105, a set of coefficients of a function or a correspondence lookup table is selected or is employed through interpolation, to thereby reduce the operation cost. It is also possible that the image signal to be inputted is separated into a plurality of components and mutually different processings are executed for the components, and then resultant signals are combined with each other. For example, the input signal is separated through preprocessing into a low-frequency component and a high-frequency component and mutually different signal level correction processings are executed for the respective components. This makes it possible to correct brightness of an associated subject and minuteness of edges. It is also possible that by executing the signal level correction processing by use of an input/output characteristic different for each region of the image signal, the correction is optimally carried out for each subject in the image. In the noise correction processing of the noise correcting unit 0102 and the signal level correction processing of the image signal correcting unit 0103, different characteristics may be employed for the luminance signal and the color signal of the image signal. Or, the processing may be executed only for either one thereof, to optimize the performance and calculation cost.

The statistic information acquiring unit 0104 receives the image signal from the noise correcting unit 0102 and measures statistic information of the signal value, to output the measured result therefrom. The statistic information includes, for example, a histogram distribution of signal values of respective pixels in the image signal and statistic quantities such as a mean value, a maximum value, a minimum value, and a standard deviation. The statistic information is used when the signal correction intensity control unit 0105 judges a scene in the image signal to appropriately control correction intensity for the image signal correcting unit 0103 to correct the signal level. It is also possible to obtain statistic information of signal values of pixels in a predetermined region of the image signal, to obtain statistic information of signal values of pixels in a region including a subject which is detected by image recognition, or to obtain statistic information for only pixels having a signal value of a predetermined range, to thereby improve scene judging performance to judge scenes. For example, when the image signal correcting unit 0103 executes the signal range correction processing by use of an input/output characteristic different for each region of the image signal, it is possible to optimally execute the signal range correction processing for each region by obtaining statistic information in units associated with the region.

The signal correction intensity control unit 0105 judges a scene in the image signal based on the statistic information from the statistic information acquiring unit 0104, to determine correction intensity for the image signal correcting unit 0103 to correct the signal level. When the image signal correcting unit 0103 executes the signal range correction processing by use of an input/output characteristic different for each region of the image signal, it is also possible to acquire statistic information measured by the signal correction intensity control unit 0105 in units associated with the region, to thereby determine the correction intensity for each region. The method of controlling the correction intensity in the signal level correction processing will be described later by referring to FIGS. 2A, 2B, 3A, and 3B.

The signal extension estimating unit 0106 estimates a signal extension degree which is an evaluation value indicating a degree of magnification of the signal magnified by the signal level correction conducted by the image signal correcting unit 0103, based on the correction intensity determined by the signal correction intensity control unit 0105. The signal extension degree will be most simply estimated as below. When the signal extension degree becomes larger as the correction intensity is higher in the signal level correction, that is, when a positive correlation exists between the signal extension degree and the correction intensity, the correction intensity of the signal level correction may be regarded as the signal extension degree. It is also possible to calculate the signal extension degree by use of the correction intensity of the signal level correction based on the coefficients of a function or a conversion table to establish a correspondence between the correction intensity of the signal level correction and the signal extension degree, to thereby improve precision of the calculation.

The noise correction intensity control unit 0107 determines and controls the correction intensity in the noise correction processing of the noise correcting unit 0102, based on the signal extension degree estimated by the signal extension estimating unit 0106. By conducting the noise correction based on the correction intensity, the noise correcting unit 0102 is able to carry out the noise correction according to the correction intensity for the signal level correction processing of the image signal correcting unit 0103.

There may be employed a configuration in which the statistic information acquiring unit 0104 acquires statistic information by use of the image signal from the image signal input unit 0101 in place of that from the noise correcting unit 0102. Also, the statistic information acquiring unit 0104 may set, as the correction intensity of the signal level correction processing, a value inputted from an input unit, not shown, without using the statistic information from the statistic information acquiring unit 0104. In this configuration, although it is not possible to conduct the correction intensity control in association with a scene in the image signal, the statistic information acquiring unit 0104 can be dispensed with. Hence, when the system is implemented by software, the calculation time is reduced; and when the system is implemented by hardware, the development cost is reduced. The noise correction processing, the signal level correction processing, the statistic information acquisition processing, the correction intensity control processing for signal level correction, the signal level extension degree estimation processing, and the correction intensity control processing for noise correction are implemented, for example, by applications on a Central Processing Unit (CPU) of a personal computer or a microcomputer, a Digital Signal Processor (DSP), and/or a dedicated Large Scale Integration (LSI) unit of incorporated equipment. It is also possible to optimize the cost and performance by executing the signal processing such as the noise correction processing, the signal level correction processing, and the statistic information acquisition processing by use of a DSP and a dedicated LSI unit and by executing the control processing such as the correction intensity control processing for signal level correction, the signal level extension degree estimation processing, and the correction intensity control processing for noise correction by use of a microcomputer.

The image signal processing apparatus shown in FIG. 1 may include a plurality of software products and a plurality of hardware products. For example, it is also possible that the noise correction processing, the signal level correction processing, and the statistic information acquisition processing are implemented by use of different DSPs and different LSI units and the correction intensity control processing for signal level correction, the signal level extension degree estimation processing, and the correction intensity control processing for noise correction are implemented by use of a shared microcomputer. It is also possible that the noise correction processing and the correction intensity control processing for noise correction are implemented by a first DSP and a microcomputer and the signal level correction processing, the statistic information acquisition processing, the correction intensity control processing for signal level correction, and the signal level extension degree estimation processing are implemented by a second DSP and a microcomputer.

FIGS. 2A and 2B are first diagrams graphically showing an example of a correction intensity control method of correcting a signal level according to the first embodiment. In accordance with the present invention, the correction intensity control processing of the signal level correction is executed in the signal correction intensity control unit 0105. FIG. 2A shows an example of the correction intensity control method of correcting a signal level by use of statistic information. FIG. 2B shows an example of the correction intensity control method for the image signal correcting unit 0103 to correct a signal level based on correction intensity determined in advance. This shows an operation in which visibility in a dark region is improved through the correction of a signal level associated with a nonlinear input/output characteristic like in the gamma processing. As FIG. 2A shows, the statistic information acquiring unit 0104 measures statistic information, specifically, the center of gravity of the luminance histogram of the image signal, that is, the mean value of the luminance values, and then outputs the statistic information therefrom. It is also possible that the statistic information acquiring unit 0104 outputs only the luminance histogram and the signal correction intensity control unit 0105 calculates the center of gravity based on the luminance histogram inputted thereto. If the center of gravity of the luminance histogram is small, the signal correction intensity control unit 0105 judges that the scene is dark, and enhances the correction intensity of the signal level correction processing. If the center of gravity exists near the center, the signal correction intensity control unit 0105 judges that brightness of the scene is almost appropriate, and reduces the correction intensity of the signal level correction processing. As FIG. 2B shows, if the correction intensity determined by the signal correction intensity control unit 0105 has a large value, the image signal correcting unit 0103 increases the inclination of the dark section of the input/output characteristic. If the correction intensity has a small value, the control unit 0105 makes the input/output characteristic more linear. As a result, if the scene in the image signal is dark, the image signal is corrected to obtain a brighter scene; and if the brightness of the scene is almost appropriate, an image signal similar to the input image signal is produced. Hence, regardless of the scene in the image signal, it is possible to create an image signal corrected to produce a scene having appropriate brightness.

FIGS. 3A and 3B are second diagrams graphically showing an example of a correction intensity control method of correcting a signal level according to the first embodiment. In accordance with the present invention, the correction intensity control processing of the signal level correction is executed in the signal correction intensity control unit 0105.

FIG. 3A shows an example of the correction intensity control method of correcting a signal level by use of statistic information. FIG. 3B shows an example of the correction intensity control method for the image signal correcting unit 0103 to correct a signal level based on correction intensity determined in advance. The example shows an operation in which visibility in a scene having insufficient gradation is improved through the correction to widen the signal range in a predetermined zone. As FIG. 3A shows, the statistic information acquiring unit 0104 measures statistic information, specifically, a signal range based on the luminance histogram of the image signal and then outputs the statistic information therefrom. The signal range is measured as, for example, the difference between the maximum value and the minimum value of the luminance signals or the difference between the maximum value and the minimum value of the luminance signals having a frequency of appearance equal to or more than a predetermined ratio. It is also possible that the statistic information acquiring unit 0104 outputs only the luminance histogram and the signal correction intensity control unit 0105 calculates the signal range based on the luminance histogram inputted thereto. If the signal range of the luminance histogram is narrow, the signal correction intensity control unit 0105 judges that the gradation is insufficient, and enhances the correction intensity of the signal level correction processing. If the signal range of the luminance histogram is wide, the signal correction intensity control unit 0105 judges that the gradation is sufficient, and reduces the correction intensity of the signal level correction processing. As FIG. 3B shows, if the correction intensity determined by the signal correction intensity control unit 0105 has a large value, the image signal correcting unit 0103 employs an input/output characteristic to largely widen the signal range. If the correction intensity has a small value, the signal correction intensity control unit 0105 employs an input/output characteristic not to largely widen the signal range. As a result, regardless of the scene in the image signal, it is possible to create an image signal in which contrast is appropriately corrected.

Figure 4:
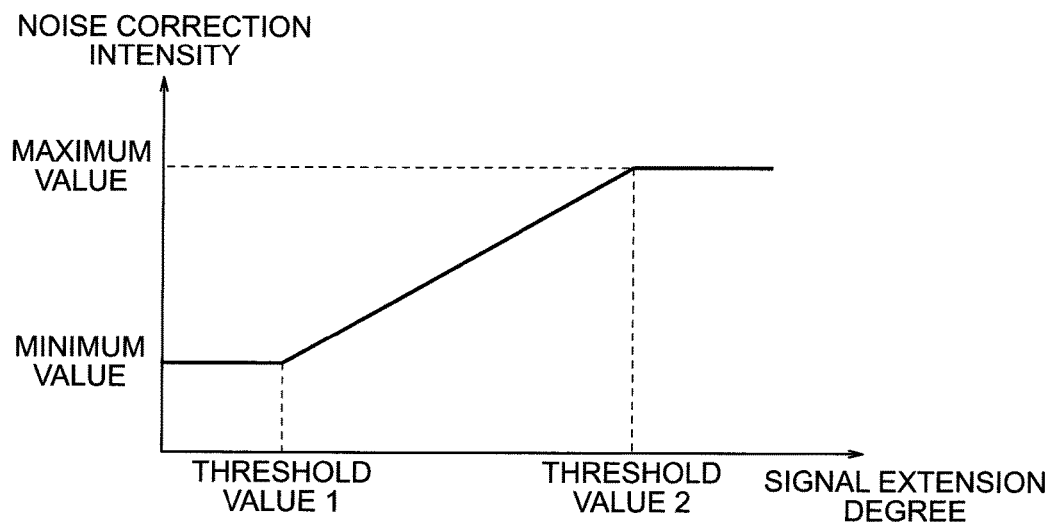
FIG. 4 is a diagram graphically showing an example of a correction intensity control method of correcting noise according to the first embodiment.

FIG. 4 shows an example of a correction intensity control method of correcting noise according to the first embodiment. In accordance with the present invention, the correction intensity control processing of the noise correction is executed in the noise correction intensity control unit 0107. As FIG. 4 shows, based on a signal extension degree obtained from the signal extension estimating unit 0106, the noise correction intensity control unit 0107 controls the correction intensity of the noise correction processing. In the operation, the correction intensity of the noise correction processing is increased as the signal extension degree becomes larger. As a result, when the signal correction intensity control unit 0105 executes the signal range correction processing to extend the signal, reduction in the picture quality due to simultaneous emphasis of the noise component can be suppressed by enhancing the noise correction effect according to the signal extension degree. As FIG. 4 shows, in a situation in which the signal extension degree is less than, for example, predetermined threshold value 1, by keeping the noise correction intensity not less than the minimum value, a noise correction can be appropriately achieved even if the effect of the signal range correction processing is weak. In a situation in which the signal extension degree is less than predetermined threshold value 2, by keeping the noise correction intensity not more than the maximum value, it is possible to prevent an event in which minuteness is excessively lost due to too much noise correction and it is also possible to prevent an event in which the noise correction degree exceeds a predetermined setting range. Although the relationship between the signal extension degree and the noise correction intensity linearly changes between thresholds 1 and 2 for simplicity of description in FIG. 4, control may be performed to change the relationship in a nonlinear way. Or, threshold values may be further disposed between thresholds 1 and 2 to conduct interpolation by use of a plurality of line segments. Or, values of correction intensity may be discretely disposed such that the relationship between the signal extension degree and the noise correction intensity changes in a discontinuous way.

Figure 5A:
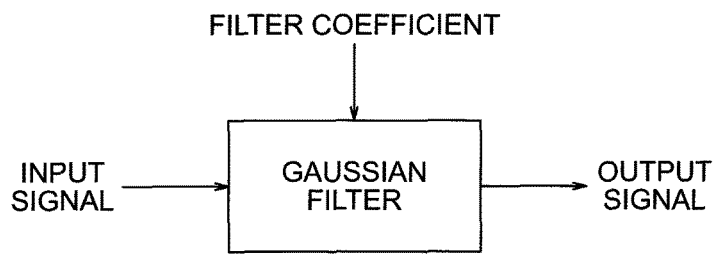
FIG. 5A is a diagram showing an example of a noise correction method using a Gaussian filter according to the first embodiment.
Figure 5B:
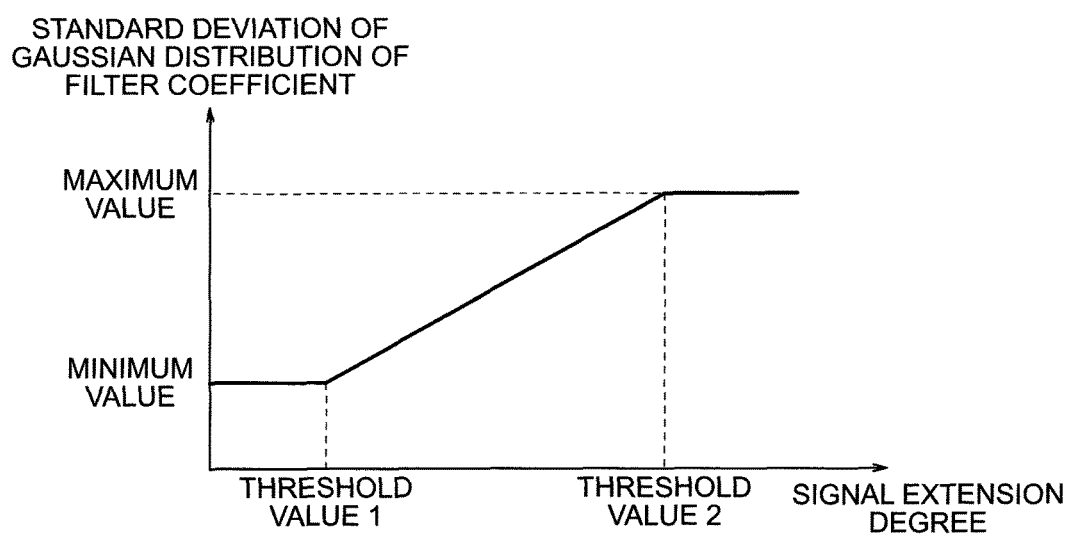
FIG. 5B is a first diagram graphically showing an example of a correction intensity control method of correcting noise by use of a Gaussian filter according to the first embodiment.
Figure 5C:
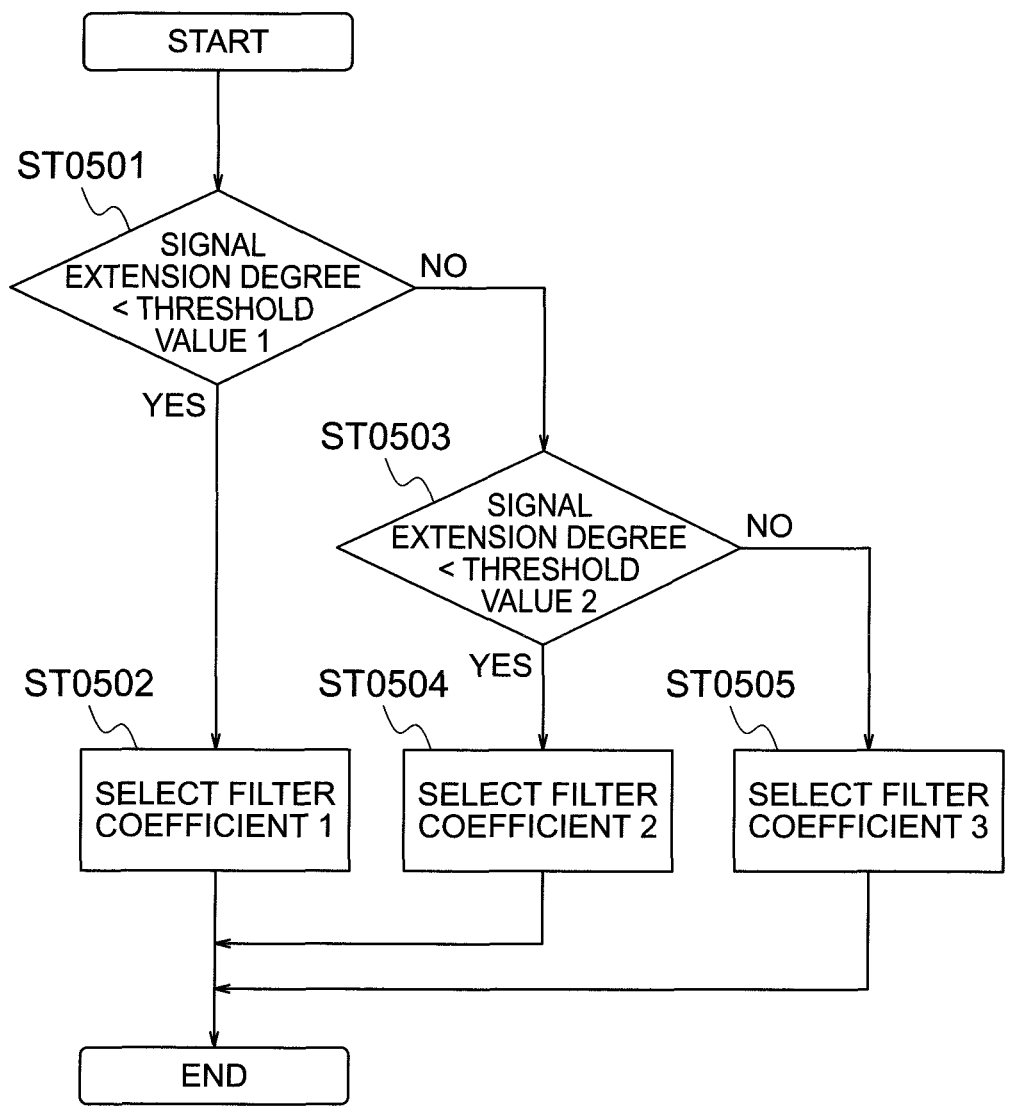
FIG. 5C is a flowchart showing an example of a correction intensity control method of correcting noise by use of a Gaussian filter according to the first embodiment.

FIGS. 5A to 5C are first diagrams showing examples of the noise correction method according to the first embodiment. In accordance with the present invention, the noise correction processing is executed in the noise correcting unit 0102. The noise correction processing shown in FIGS. 5A to 5C is two-dimensional noise correction processing achieved by the noise correcting unit 0102 by use of a Gaussian filter. FIG. 5A shows an example of the noise correction method using a Gaussian filter. FIG. 5B shows an example of the correction intensity control method of correcting noise by use of a Gaussian filter. FIG. 5C is a flowchart showing an example of the correction intensity control method of correcting noise by using a Gaussian filter. As FIG. 5A shows, the noise correcting unit 0102 executes, as the noise correction processing, two-dimensional noise correction processing by use of a Gaussian filter, specifically, executes filter processing based on a predetermined filter coefficient for the input image signal to correct noise, to thereby create an output image signal. The Gaussian filter is a spatial filter having a weight conforming to the Gaussian distribution in accordance with distance from a pixel under consideration. The smoothing effect of the filter for the noise correction can be varied by changing the standard deviation of the Gaussian distribution. In the example of FIG. 5B, the noise correction intensity control unit 0107 increases the standard deviation of the Gaussian distribution of the filter coefficient as the signal extension degree becomes larger. Based on the standard deviation determined by the noise correction intensity control unit 0107, the noise correcting unit 0102 determines the filter coefficient and then executes the filter processing. As a result, by increasing the noise correction effect according to the signal extension degree of the signal level correction processing in the signal correction intensity control unit 0105, reduction in the picture quality due to simultaneous emphasis of the noise component can be suppressed. The example shown in FIG. 5C is a method in which a combination of filter coefficients of different correction effects is beforehand prepared to select a filter coefficient according to magnitude of the signal extension degree. In step ST0501, the signal extension degree is compared with threshold value 1. If it is less than threshold value 1, control goes to step ST0502; otherwise, control goes to step ST0503. In step ST0502, filter coefficient 1 is selected. In step ST0503, the signal extension degree is compared with threshold value 2. If it is less than threshold value 2, control goes to step ST0504; otherwise, control goes to step ST0505. In step ST0504, filter coefficient 2 is selected. In step ST0505, filter coefficient 3 is selected. By selecting the filter coefficients such that filter coefficient 2 is stronger in the noise correction effect than filter coefficient 1 and filter coefficient 3 is stronger in the noise correction effect than filter coefficient 2, it is possible to increase the noise correction effect according to the signal extension degree of the signal level correction processing in the signal correction intensity control unit 0105. In the example shown in FIG. 5C, it is possible to achieve the same effect as for that shown in FIG. 5B at a lower cost.

Figure 6A:
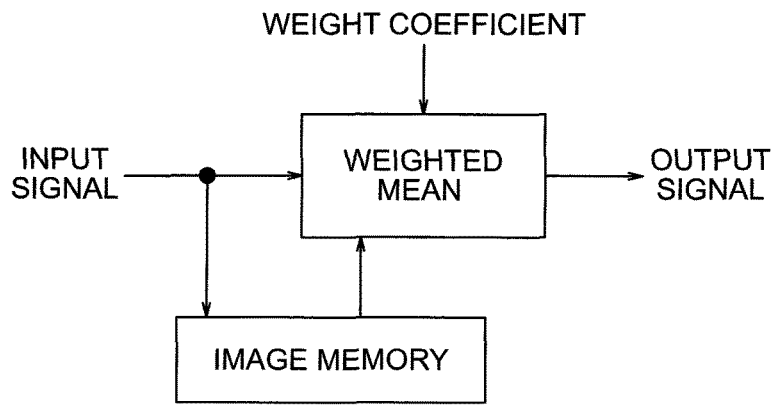
FIG. 6A is a diagram showing an example of a noise correction method through three-dimensional noise correction processing according to the first embodiment.
Figure 6B:
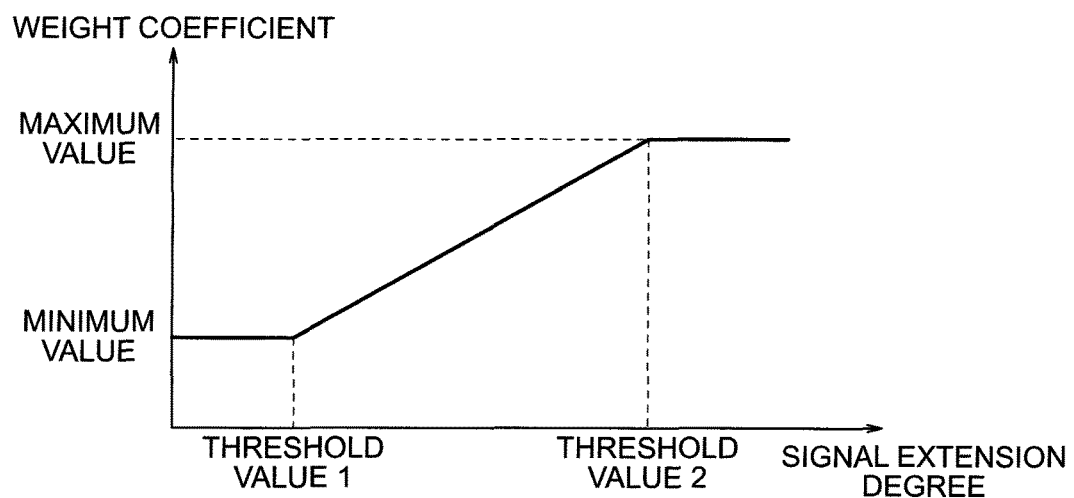
FIG. 6B is a diagram showing an example of a correction intensity control method of correcting noise by use of three-dimensional noise correction processing according to the first embodiment.

FIGS. 6A and 6B are second diagrams showing examples of the noise correction method according to the first embodiment. In accordance with the present invention, the noise correction processing is executed in the noise correcting unit 0102. The noise correction processing shown in FIGS. 6A and 6B is three-dimensional noise correction processing achieved by the noise correcting unit 0102. FIG. 6A is an example of the three-dimensional noise correction processing. FIG. 6B shows an example of the correction intensity control method of correcting noise when the three-dimensional noise correction processing is employed. As FIG. 6A shows, when executing three-dimensional noise correction processing as the noise correction processing, the noise correcting unit 0102 corrects noise by conducting an operation to obtain a weighted mean with a predetermined weight coefficient for an input image signal via the image memory, specifically, for an image signal of the image in consideration and one or more different image signals associated with one and the same scene in the continuous time axis, to thereby create an output image signal. It is hence possible to effectively correct random noise, and it is possible to vary the effect of the noise correction by changing the weight coefficient of the image in consideration. In the example shown in FIG. 6B, the noise correction intensity control unit 0107 increases the weight coefficient of the image in consideration for the weighted mean as the signal extension degree becomes larger. Based on the weight coefficient determined by the noise correction intensity control unit 0107, the noise correcting unit 0102 executes the weighted-mean processing. As a result, by increasing the noise correction effect according to the signal extension degree of the signal level correction processing in the signal correction intensity control unit 0105, reduction in the picture quality due to simultaneous emphasis of the noise component can be suppressed.

Figure 7:
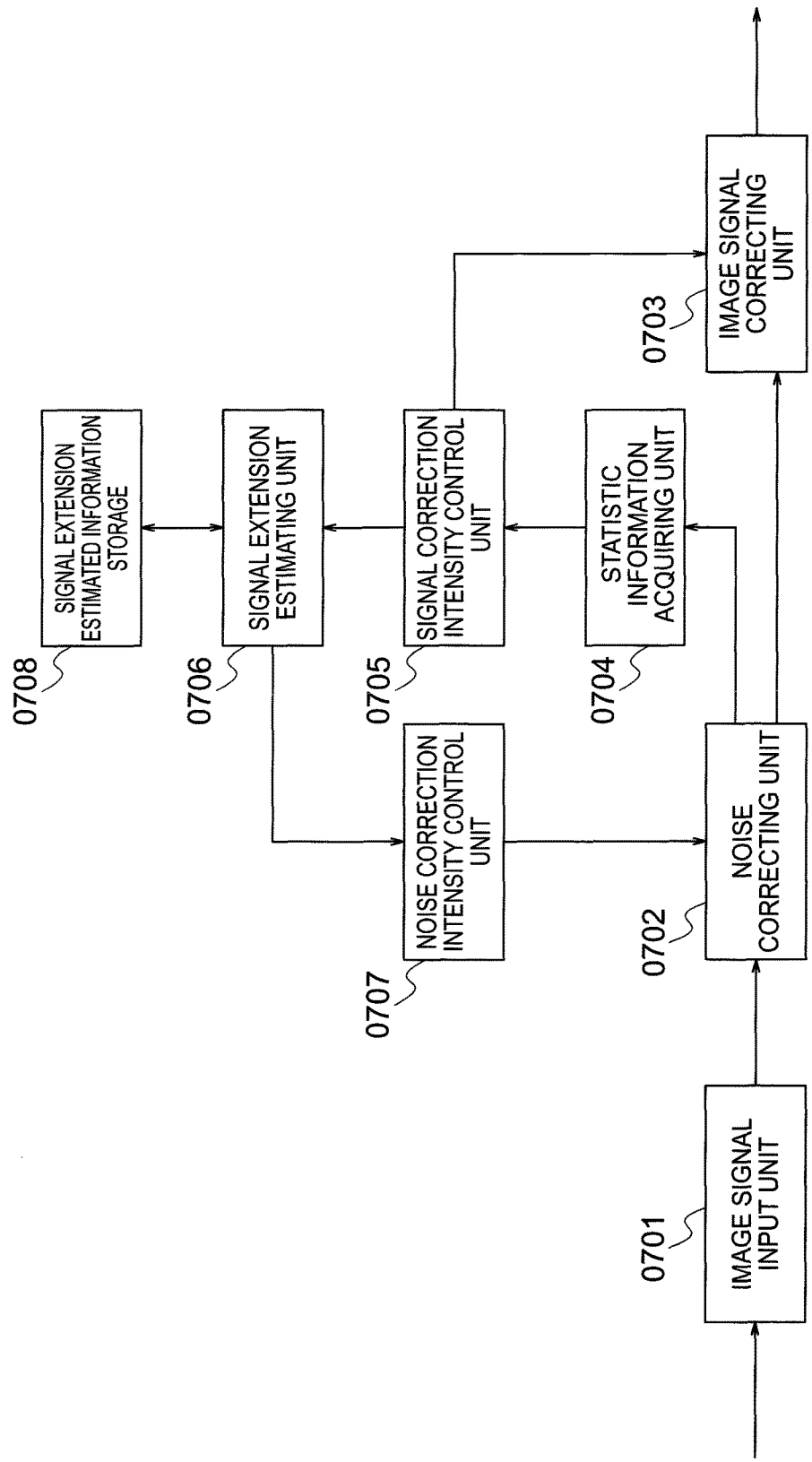
FIG. 7 is a second schematic diagram showing an image signal processing apparatus according to the first embodiment.

FIG. 7 is a second schematic diagram showing an image signal processing apparatus according to the first embodiment of the present invention. The apparatus of FIG. 7 includes an image signal input unit 0701, a noise correcting unit 0702, an image signal correcting unit 0703, a statistic information acquiring unit 0704, a signal correction intensity control unit 0705, a signal extension estimating unit 0706, a noise correction intensity control unit 0707, and a signal extension estimation information storage 0708. This configuration is implemented by adding the signal extension estimation information storage 0708 to the diagram of an image signal processing apparatus according to the first embodiment shown in FIG. 1.

In the image signal processing apparatus of FIG. 1, the signal extension estimation information storage 0708 corresponds to a Read Only Memory (ROM), a nonvolatile memory, or a recording medium on a program and is employed to store therein signal extension estimation information for the signal extension estimating unit 0706 to estimate, based on the correction intensity of the signal level correction determined by the signal correction intensity control unit 0705, the signal extension degree, which is used by the image signal correcting unit 0703 to conduct the signal level correction. For the signal extension estimation information, if the input/output characteristic of the signal level correction in the image signal correcting unit 0703 is known, it is only required to beforehand obtain and store the signal extension estimation degree in association with the input/output characteristic. If the input/output characteristic is unknown, it is only required to beforehand obtain and to store an estimation value estimated through calibration. By use of the correction intensity of the signal level correction determined by the signal correction intensity control unit 0705 and the signal extension estimation information obtained from the signal extension estimation information storage 0708, the signal extension estimating unit 0706 is capable of estimating, at high precision, the signal extension conforming to the input/output characteristic of the signal level correction in the image signal correcting unit 0703. As a result, the noise correction can be optimally achieved according to the correction effect of the signal level correction processing, to create an image signal having high picture quality and high visibility.

Figure 8A:
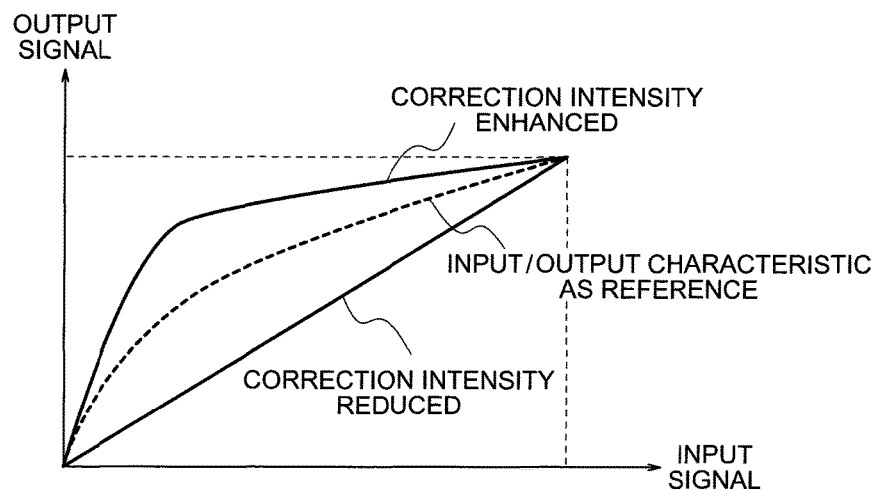
FIG. 8A is a third diagram graphically showing an example of a signal level correction method according to the first embodiment.
Figure 8B:
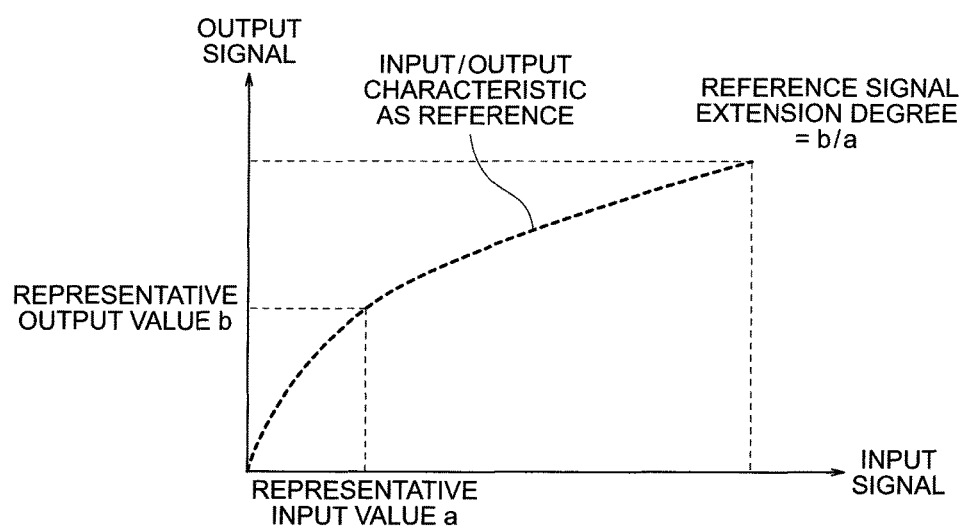
FIG. 8B is a first diagram graphically showing an example of signal extension estimation information according to the first embodiment.
Figure 8C:
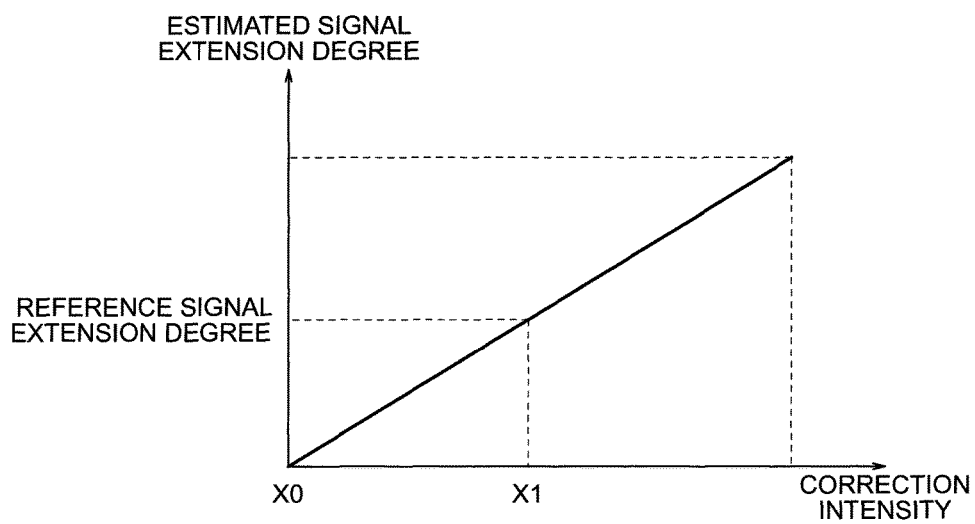
FIG. 8C is a first diagram showing an example of a signal extension estimation method using signal extension estimation information according to the first embodiment.
Figure 8D:
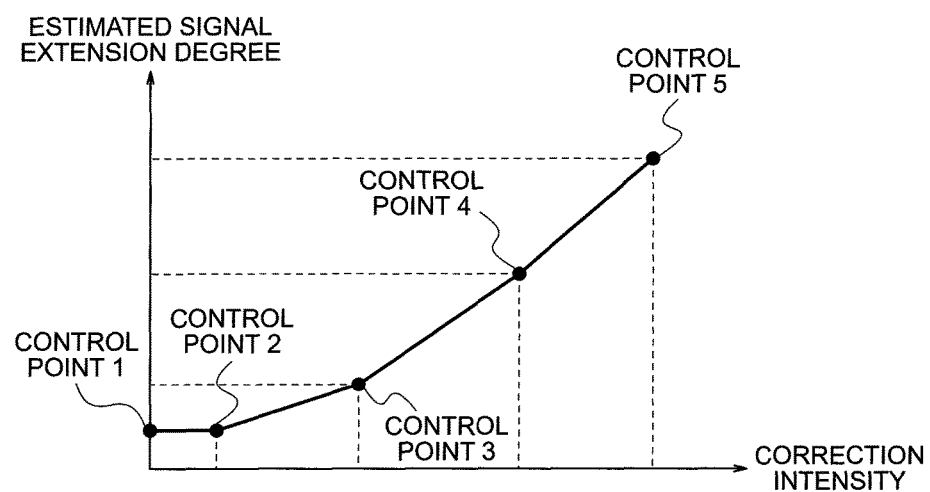
FIG. 8D is a second diagram showing an example of a signal extension estimation method using signal extension estimation information according to the first embodiment.

FIGS. 8A to 8D show examples of the signal extension estimation processing using signal extension estimation information according to the first embodiment. In accordance with the present invention, the signal extension estimation processing is executed in the signal extension estimating unit 0706. FIG. 8A is a third diagram showing an example of the signal level correction method, namely, processing to improve visibility in a dark region through a signal level correction having a nonlinear input/output characteristic like in the gamma processing. FIG. 8B is a first diagram showing an example of signal extension estimation information, FIG. 8C is a first diagram showing an example of the signal extension estimation method using signal extension estimation information, and FIG. 8D is a second diagram showing an example of the signal extension estimation method using signal extension estimation information.

As FIG. 8A shows, if the correction intensity determined by the signal correction intensity control unit 0705 has a large value, the image signal correcting unit 0703 increases the inclination of the graph in the dark section of the input/output characteristic. If the correction intensity has a small value, the image signal correcting unit 0703 makes the input/output characteristic more linear. In this example, the image signal correcting unit 0703 keeps an input/output characteristic as a reference and amplifies intensity of an input/output correction as a reference according to the correction intensity determined by the signal correction intensity control unit 0705, to thereby conduct the image signal correction. In the operation, as FIG. 8B shows, the signal extension estimation information storage 0708 stores therein, as signal extension estimation information, a reference signal extension degree which is a ratio between input signal value a and output signal value b of a representative signal level in the reference input/output correction. The representative signal level may be, for example, a signal level at which the ratio between input signal value a and output signal value b takes the maximum value. In this situation, the amplification factor when the signal is most amplified in the signal level correction processing may be regarded as the reference signal extension degree. As FIG. 8C shows, in a situation in which the correction intensity of the signal range correction is correction intensity to conduct correction according to the reference input/output characteristic, if the correction intensity varies, the signal extension estimating unit 0706 sets, as the signal extension degree, a result obtained by correcting the reference signal extension degree by use of the correction intensity. As a result, it is possible to estimate the signal extension degree according to the input/output characteristic of the actual signal level correction. FIG. 8D shows a second example of the signal extension estimation processing. In this example, the signal extension estimation information storage 0708 beforehand stores therein, as control points, a plurality of reference signal extension degrees associated with the correction intensity of the signal level correction processing, and the signal extension estimating unit 0706 obtains a signal extension degree corresponding to the actual correction intensity through interpolation using control points in the neighborhood. It is hence possible to appropriately estimate the signal extension degree with high precision even if a nonlinear relationship exists between the correction intensity and the signal extension degree.

Figure 9A:
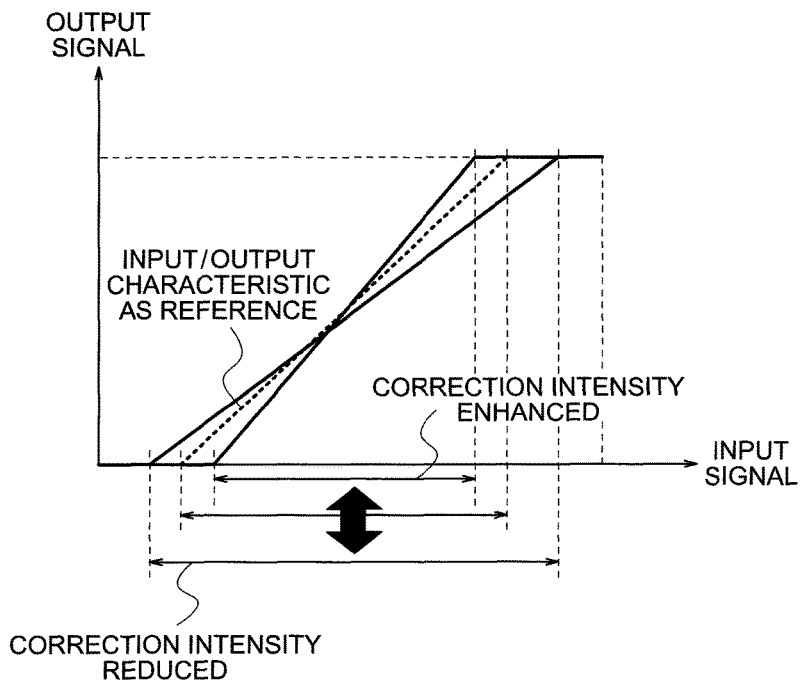
FIG. 9A is a fourth diagram graphically showing an example of a signal level correction method according to the first embodiment.
Figure 9B:
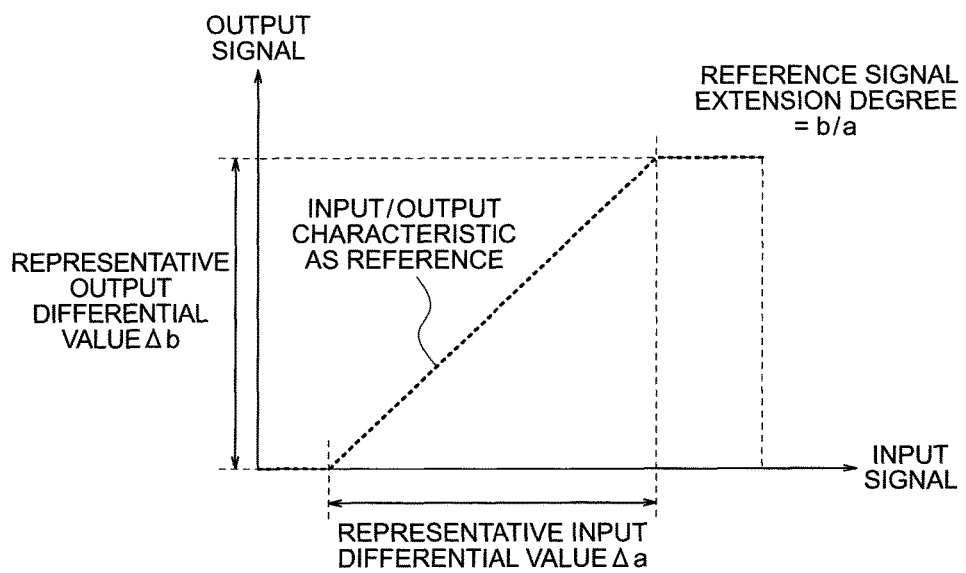
FIG. 9B is a second diagram showing an example of signal extension estimation information according to the first embodiment.

FIGS. 9A and 9B are second diagrams graphically showing an example of signal extension estimation processing using signal extension estimation information according to the first embodiment. In the present invention, the signal extension estimation processing is executed in the signal extension estimating unit 0706. FIG. 9A is a fourth diagram showing an example of the signal level correction method in which the correction is conducted to widen the signal range in a predetermined zone, to improve visibility of a scene having insufficient gradation. FIG. 9B is a second diagram showing an example of the signal extension estimation information.

As FIG. 9A shows, if the correction intensity determined by the signal correction intensity control unit 0705 has a large value, the image signal correcting unit 0703 increases the magnification factor of the signal range. If the correction intensity has a small value, the image signal correcting unit 0703 decreases the magnification factor of the signal range. In the operation, as FIG. 9B shows, the signal extension estimation information storage 0708 stores therein, as signal extension estimation information, a reference signal extension degree which is a ratio between input signal differential value Δa and output signal differential value Δb of the signal level between two representative points in the reference input/output correction. The representative signal level may be, for example, a signal level at which the ratio between input signal differential value Δa and output signal differential value Δb takes the maximum value. In this situation, the extension ratio when the signal is most amplified in the signal level correction processing may be regarded as the reference signal extension degree. As above, by storing appropriate signal extension estimation information according to the input/output characteristic of the signal level correction processing in the image signal correcting unit 0703, it is possible to estimate the signal extension degree conforming to the input/output characteristic of the actual signal level correction.

Figure 10A:
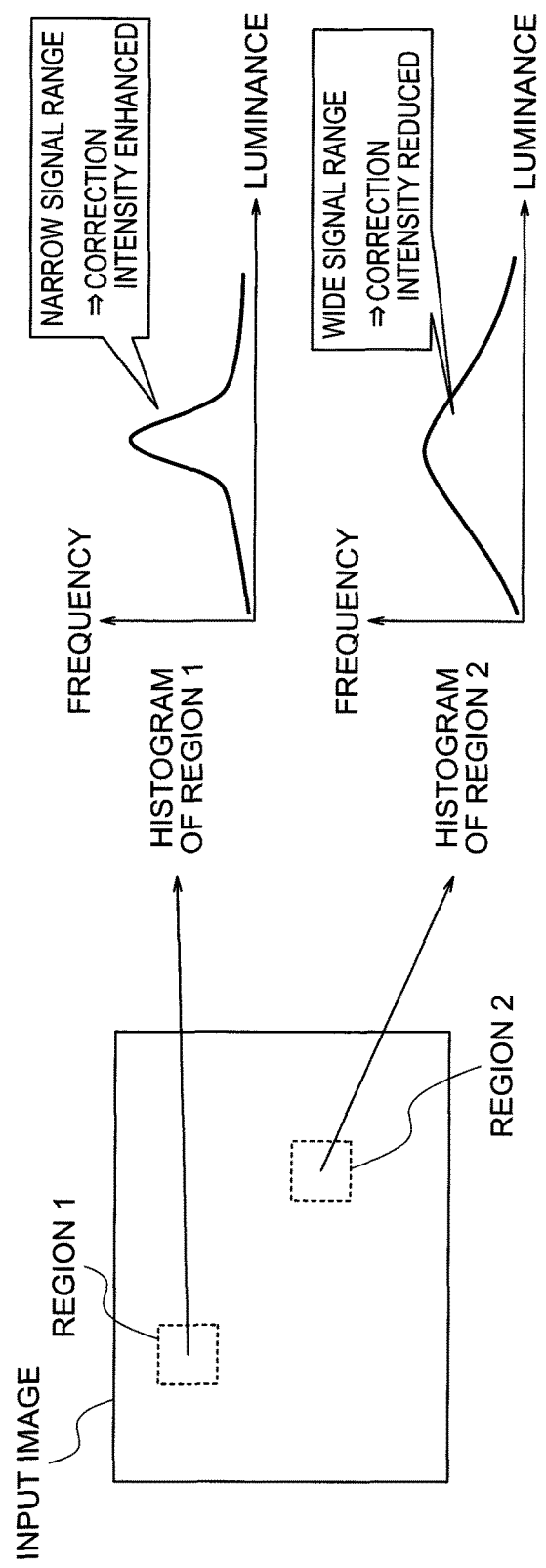
FIG. 10A is a third diagram graphically showing an example of a correction intensity control method of correcting a signal level by use of statistic information according to the first embodiment.
Figure 10B:
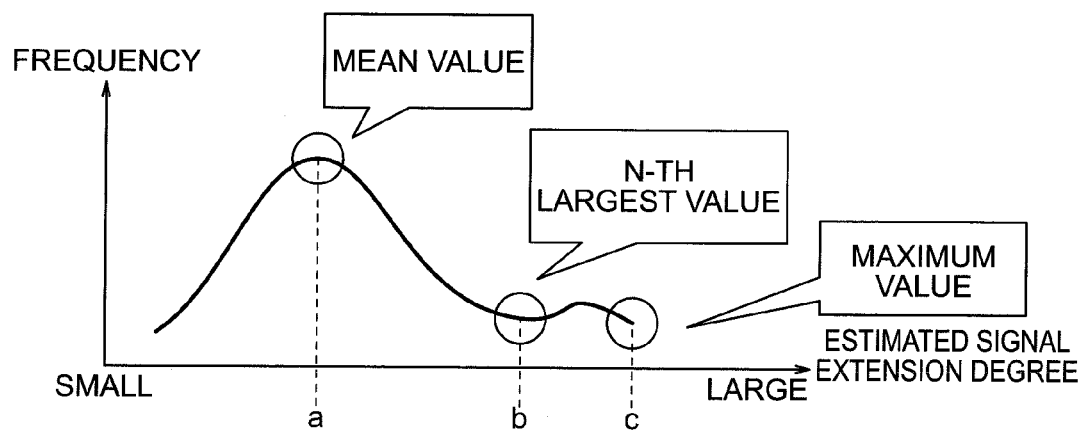
FIG. 10B is a third diagram showing an example of signal extension estimation information according to the first embodiment.

FIGS. 10A and 10B are third diagrams graphically showing an example of signal extension estimation processing using signal extension estimation information according to the first embodiment. In the present invention, the signal extension estimation processing is executed by the signal extension estimating unit 0706. FIG. 10A is a third diagram showing an example of the correction intensity control method of the signal level correction using statistic information. FIG. 10B is a third diagram showing an example of the signal extension estimation information.

As FIG. 10A shows, the image signal correcting unit 0703 may execute the signal level correction processing by use of an input/output characteristic different for each region in the image signal. For example, for area 1 having a narrow signal range, the correction intensity is increased in the signal level correction processing; for area 2 having a wide signal range, the correction intensity is decreased in the signal level correction processing. It is hence possible to appropriately conduct the correction for each region in the image signal. As FIG. 10B shows, the signal extension estimating unit 0706 collects statistic values of the signal extension degrees estimated for the respective regions and outputs a resultant statistic quantity as the signal extension degree to be used by the noise correction intensity control unit 0707. For the statistic quantity, it is only necessary to select and to calculate mean value a, N-th largest value b, maximum value c, or the like of the signal extension degrees estimated for the respective regions. When mean value a is employed, it is possible to correct noise according to an average signal extension degree of the overall image, to thereby create an image in which influence from noise is generally reduced. When maximum value c is employed, it is possible to create an image in which influence from noise is reduced in a region having the largest extension degree. When N-th largest value b is employed, even if maximum value c is a value calculated for a region affected by external disturbance or the like, it is possible, by removing the influence from the external disturbance, to create an image in which influence from noise is reduced in association with a region having a large extension degree. In this way, the statistic quantity is only required to be selected according to the purpose. Hence, additionally, it is possible to employ a weighted mean value or a median obtained through weighting operation according to positions in the image.

According to the present embodiment, by determining the correction intensity of the noise correction based on the control information of the correction intensity for the signal level correction, the noise correction is optimally carried out according to effect of the signal level correction. It is hence possible to create an image having high picture quality and high visibility at a low cost.

Embodiment 2

Figure 11:
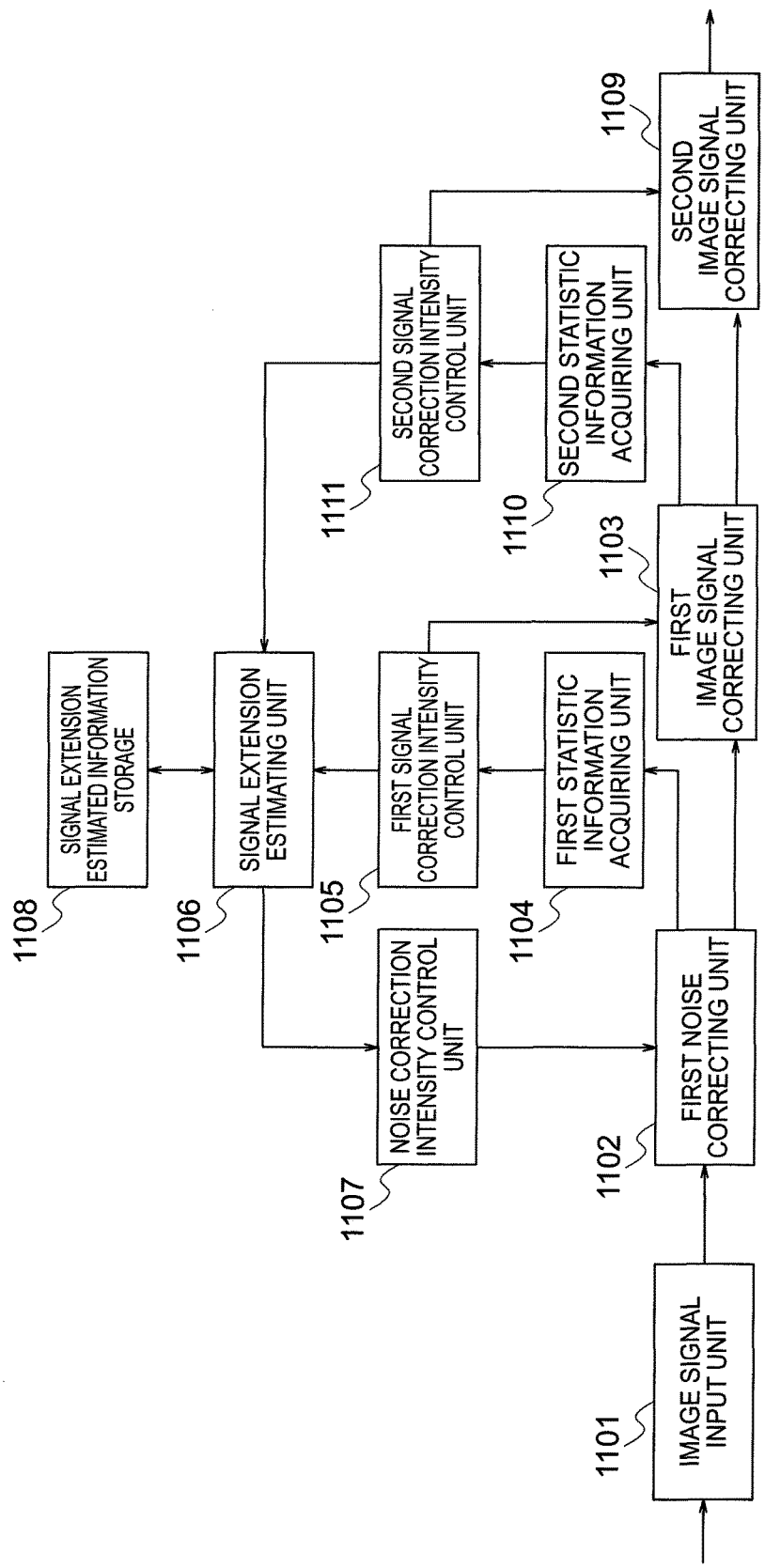
FIG. 11 is a schematic diagram showing an image signal processing apparatus according to a second embodiment of the present invention.

FIG. 11 schematically shows an image signal processing apparatus according to a second embodiment of the present invention. The image signal processing apparatus of FIG. 11 includes an image signal input unit 1101, a noise correcting unit 1102, a first image signal correcting unit 1103, a first statistic information acquiring unit 1104, a first signal correction intensity control unit 1105, a signal extension estimating unit 1106, a noise correction intensity control unit 1107, a signal extension estimation information storage 1108, a second image signal correcting unit 1109, a second statistic information acquiring unit 1110, and a second signal correction intensity control unit 1111. This configuration is implemented by adding the second image signal correcting unit 1109, the second statistic information acquiring unit 1110, and the second signal correction intensity control unit 1111 to the image signal processing apparatus shown in FIG. 7. The image signal processing apparatus shown in FIG. 11 differs from that shown in FIG. 7 in that a plurality of image signal correcting units, statistic information acquiring units, and signal correction intensity control units are included.

In the image signal processing apparatus shown in FIG. 11, the second image signal correcting unit 1109 receives an image signal outputted from the first image signal correcting unit 1103 and executes the signal level correction processing by use of an input/output characteristic different from that used by the first image signal correcting unit 1103. The second statistic information acquiring unit 1110 receives an image signal outputted from the first image signal correcting unit 1103 and measures statistic information of the signal value of the image signal, to output the statistic information therefrom. As the statistic information, it is only necessary to select information suitable to control the input/output characteristic in the operation in which the second image signal correcting unit 1109 corrects the signal level. It is not necessarily required that the statistic information is substantially equal to that measured by the first statistic information acquiring unit 1104. The second signal correction intensity control unit 1111 judges a scene in the image signal based on the statistic information outputted from the second statistic information acquiring unit 1110 and then determines the correction intensity for the second image signal correcting unit 1109 to correct the signal level. If the second signal correction intensity control unit 1111 is capable of commonly using the statistic information measured by first statistic information acquiring unit 1104, there may be employed a configuration in which the statistic information from first statistic information acquiring unit 1104 is used as the input signal. Hence, the cost reduction is possible by removing the second statistic information acquiring unit 1110. Based on the correction intensity of the signal level correction for the first image signal correcting unit 1103 determined by the first signal correction intensity control unit 1105 and the correction intensity of the signal level correction for the second image signal correcting unit 1109 determined by the second signal correction intensity control unit 1111, the signal extension estimating unit 1106 estimates a signal extension degree of both of the image signal correcting units by combining the signal extension degree of the signal level correction processing in the first image signal correcting unit 1103 with the signal extension degree of the signal level correction processing in the second image signal correcting unit 1111 and then outputs the overall signal extension degree to the noise correction intensity control unit 1107. By using the overall signal extension degree associated with all of the image signal correcting units, the noise correction intensity control unit 1107 controls the correction intensity of the noise correction. As a result, even if a plurality of signal level correction processings are combined with each other, it is possible to determine the noise correction intensity by taking the influence from the overall signal extension into consideration, to thereby improve the picture quality. Although the image signal processing apparatus shown in FIG. 11 includes two image signal correcting units, two statistic information acquiring units, and two signal correction intensity control units, the configuration may also includes three or more image signal correcting units, three or more statistic information acquiring units, and three or more signal correction intensity control units.

Figure 12A:
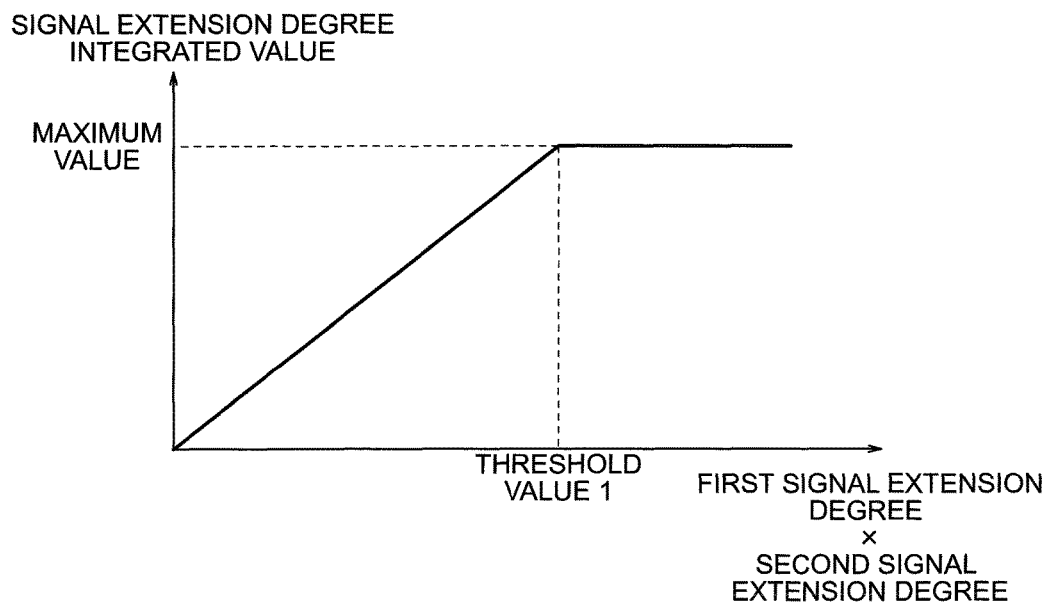
FIG. 12A is a diagram graphically showing an example of a signal extension estimation method according to the second embodiment.
Figure 12B:
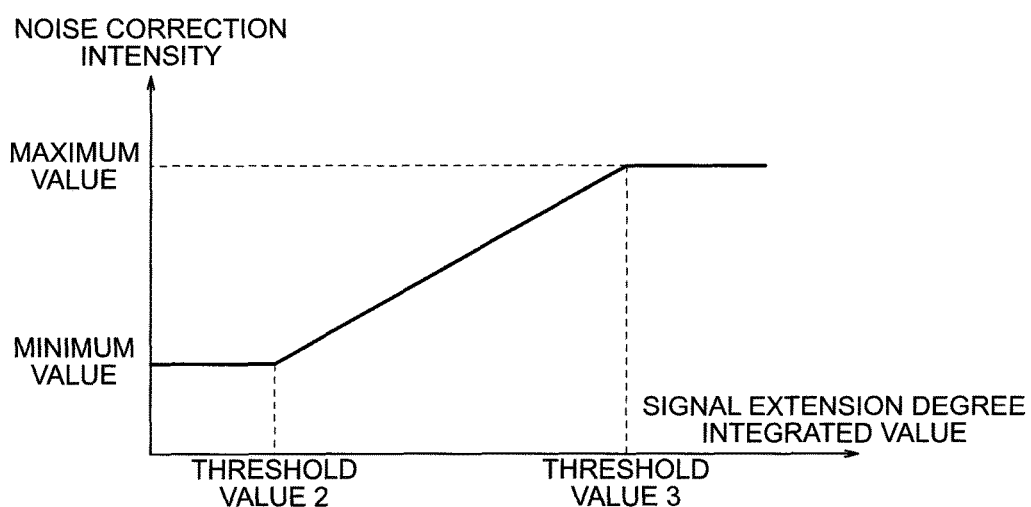
FIG. 12B is a diagram showing an example of a noise correction intensity control method according to the second embodiment.

FIGS. 12A and 12B are diagrams showing examples of the signal extension estimation method and the noise correction intensity control method according to the second embodiment. In accordance with the present invention, the signal extension estimation processing is implemented by the signal extension estimating unit 1106. FIG. 12A shows an example of the signal extension estimation method and FIG. 12B shows an example of the noise correction intensity control method.

As FIG. 12A shows, the signal extension degree is an evaluation value indicating an amplification factor or an extension ratio of a signal. It is hence possible to calculate the signal extension degree associated with all of the image signal correcting units by multiplying the signal extension degree of the signal level correction in the first image signal correcting unit 1103 estimated based on the correction intensity of the signal level correction in the first image signal correcting unit determined by the first signal correction intensity control unit 1105 by the signal extension degree of the signal level correction in the second image signal correcting unit 1109 estimated based on the correction intensity of the signal level correction in the second image signal correcting unit 1109 determined by the second signal correction intensity control unit 1111. In the operation, it is also possible, by restricting the product not to exceed the maximum value, to prevent an event in which the result of calculation of the signal extension degree exceeds the controllable range. If the signal extension degree is an evaluation value having, for example, a logarithmic relationship with respect to the amplification factor and the extension ratio of the actual signal, it is only necessary to conduct addition in place of multiplication. In this way, the calculation method may be changed according to the characteristic of the signal extension degree. As FIG. 12B shows, the noise correction intensity control unit 1107 controls the correction intensity of the noise correction by using the overall signal extension degree associated with all image signal correcting units. As a result, even if a plurality of signal level correction processings are combined with each other, it is possible to determine the noise correction intensity by taking the influence from the overall signal extension into consideration, to thereby improve the picture quality.

As above, according to the present embodiment, even if a plurality of signal level correction processings are executed with different input/output characteristics, it is possible, by optimally conducting the noise correction, to create an image having high picture quality and high visibility at a low cost.

Embodiment 3

Figure 13:
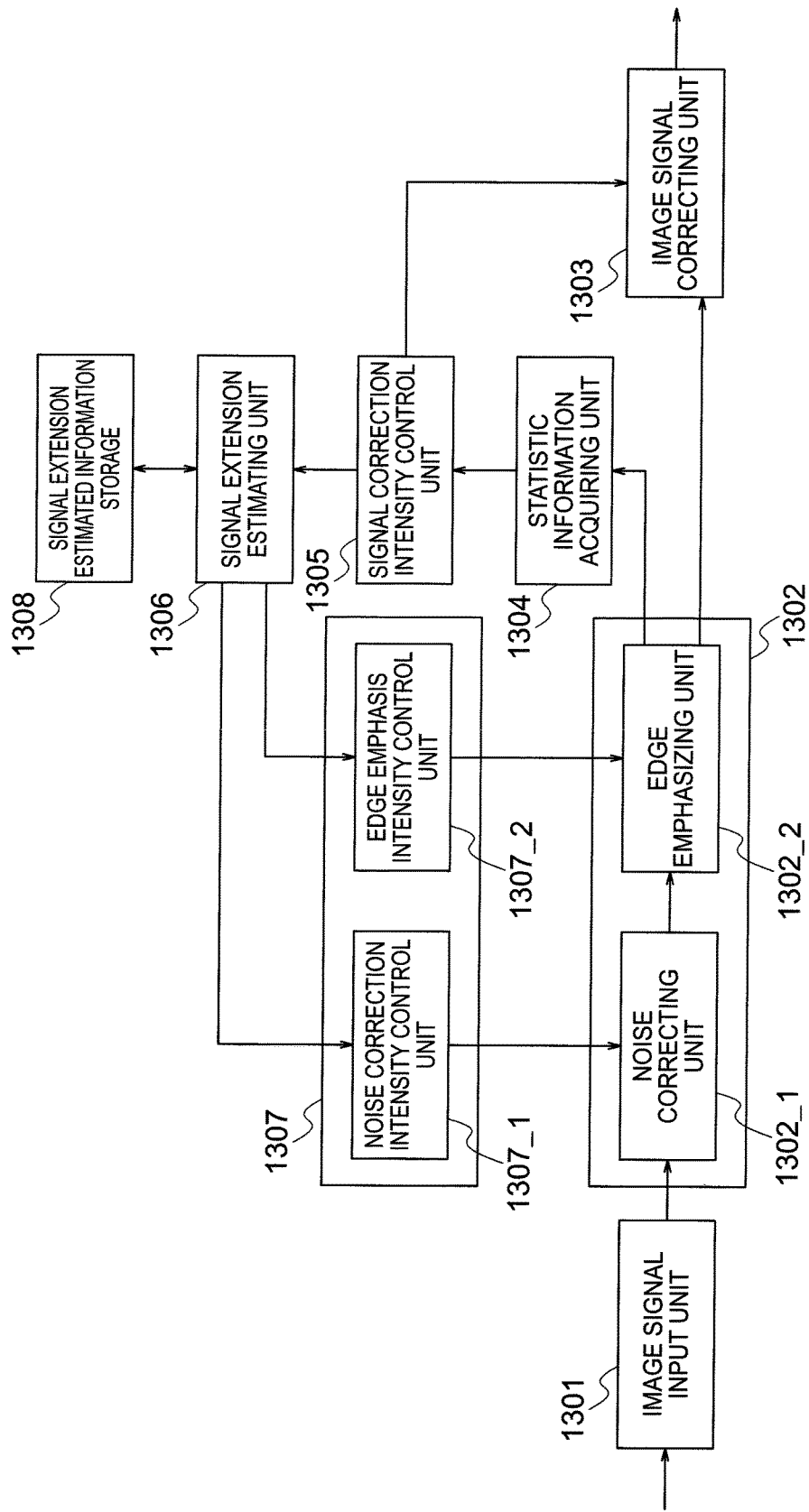
FIG. 13 is a schematic diagram showing an image signal processing apparatus according to a third embodiment of the present invention.

FIG. 13 is a schematic diagram showing an image signal processing apparatus according to the third embodiment of the present invention. The apparatus of FIG. 13 includes an image signal input unit 1301, a high-picture-quality signal processing unit 1302, a noise correcting unit 1302_1, an edge emphasizing unit 1302_2, an image signal correcting unit 1303, a statistic information acquiring unit 1304, a signal correction intensity control unit 1305, a signal extension estimating unit 1306, a picture quality control unit 1307, a noise correction intensity control unit 1307_1, an edge emphasis intensity control unit 1307_2, and a signal extension estimation information storage 1308. This configuration is implemented by replacing the noise correcting unit 0702 and the noise correction intensity control unit 0707 of the image signal processing apparatus shown in FIG. 7 respectively by the high-picture-quality signal processing unit 1302 and the picture quality control unit 1307. Further, in the noise correcting unit 0702, the high-picture-quality signal processing unit 1302 includes the noise correcting unit 1302_1 (and the edge emphasizing unit 1302_2); and the noise correction intensity control unit 0707 includes the noise correction intensity control unit 1307_1 and the edge emphasis intensity control unit 1307_2. The image signal processing apparatus shown in FIG. 13 differs from that shown in FIG. 7 in that in addition to the noise correcting unit, the edge emphasizing unit is disposed as signal processing for high picture quality.

In the image signal processing apparatus shown in FIG. 13, the edge emphasizing unit 1302_2 executes edge emphasis processing for an image signal inputted from the noise correcting unit 1302_1, to produce an output image signal. The edge emphasis processing is implemented, for example, as below. From the input image signal, a signal component having a predetermined frequency band is extracted by use of a high-pass filter or a band-pass filter, gain processing is conducted for the signal component, and then the resultant signal is added to the input image signal. The edge emphasis intensity control unit 1307_2 determines and controls, based on the signal extension degree estimated by the signal extension estimating unit 1306, the emphasis intensity to be used by the signal extension estimating unit 1306 to execute the edge emphasis processing. Based on the emphasis intensity, the edge emphasizing unit 1302_2 carries out edge emphasis, to thereby conduct the edge emphasis according to the correction intensity of the signal level correction processing in the image signal correcting unit 1303. In the image signal processing apparatus shown in FIG. 13, an image signal outputted from the noise correcting unit 1302_1 is inputted to the edge emphasizing unit 1302_2 of the edge emphasizing unit 1302, to thereby suppress the simultaneous emphasis of noise at edge emphasis processing. However, there may be employed a configuration in which an image signal outputted from the edge emphasizing unit 1302_2 is inputted to the noise correcting unit 1302_1 or another high-picture-quality signal processing is disposed between or before and after the noise correcting unit 1302_1 and the edge emphasizing unit 1302_2. Also, it is possible that the image signal to be inputted to the high-picture-quality signal processing unit 1302 is separated through preprocessing into a low-frequency component and a high-frequency component. Mutually different noise correction processings and edge emphasis processings are executed for the respective components, to thereby effectively remove noise therefrom while emphasizing minuteness of the edge. The high-picture-quality signal processing including the noise correction processing and the edge emphasis operation as well as the image control processing including the edge emphasis intensity control operation and the image control processing are implemented, for example, by applications on a CPU of a personal computer or a microcomputer, a DSP, and/or a dedicated LSI unit of incorporated equipment. It is also possible to optimize the cost and performance by executing the high-picture-quality signal processing as the signal processing by use of a DSP and a dedicated LSI unit and by executing the picture quality control processing as the control processing by use of a microcomputer.

Figure 14:
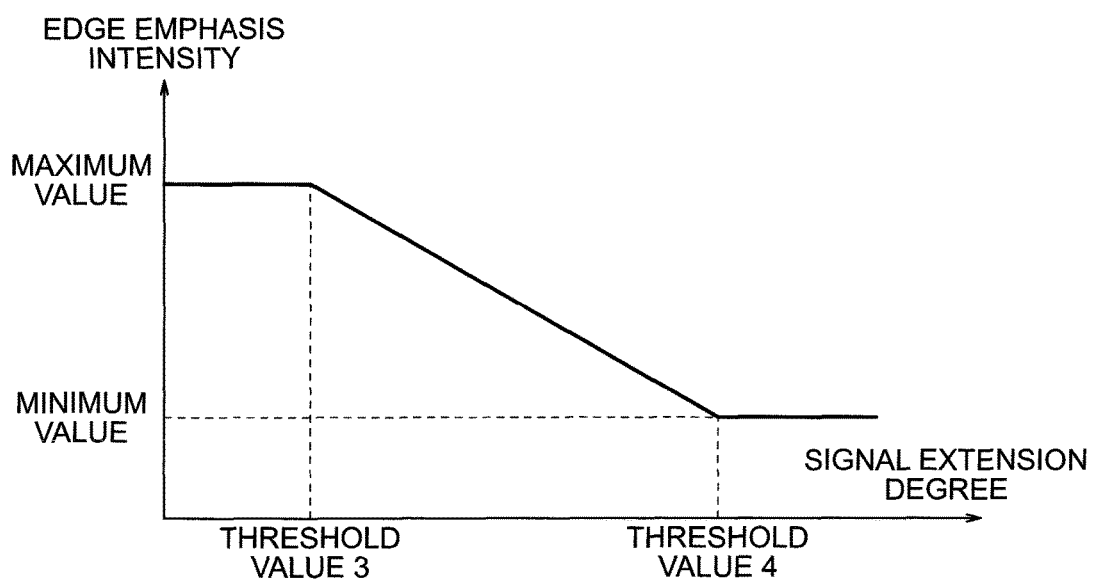
FIG. 14 is a diagram graphically showing an example of an emphasis intensity control method of edge emphasis according to the third embodiment.

FIG. 14 graphically shows an example of the emphasis intensity control method of edge emphasis according to the third embodiment. In accordance with the present invention, the edge emphasis intensity control processing for the edge emphasis is executed by the edge emphasis intensity control unit 1307_2. As FIG. 14 shows, based on the signal extension degree from the signal extension estimating unit 1306, the edge emphasis intensity control unit 1307_2 controls the correction intensity of the edge emphasis processing in the edge emphasis intensity control unit 1307_2. In the operation, the correction intensity of the edge emphasis processing is decreased as the signal extension degree becomes larger. In the situation in which the signal correction intensity control unit 1305 executes the signal range correction processing to extend the signal, it is possible, by weakening the edge emphasis effect according to the signal extension degree, to suppress the even in which the picture quality is lowered due to further emphasis of the noise component emphasized in the edge emphasis processing. As FIG. 14 shows, if the signal extension degree is more than, for example, predetermined threshold value 4, it is possible, by keeping the edge emphasis intensity not less than the minimum value, to conduct the edge emphasis at a fixed level even if the effect of the signal range correction processing is strong. If the signal extension degree is less than predetermined threshold value 3, it is possible, by keeping the edge emphasis intensity not more than the minimum value, to prevent an event in which minuteness of the edge is too much lost due to excessive edge emphasis and to keep the edge emphasis intensity within the settable range. Although the relationship between the signal extension degree and the edge emphasis intensity linearly changes between thresholds 3 and 4 for simplicity of description in FIG. 14, control may be performed to change the relationship in a nonlinear way. Or, threshold values may be further disposed to conduct interpolation by use of a plurality of line segments. Or, values of correction intensity may be discretely disposed such that relationship between the signal extension degree and the edge emphasis intensity changes in a discontinuous way.

According to the present invention, by determining the correction intensity of the noise correction and the emphasis intensity of the edge emphasis based on the control information of the correction intensity for the signal level correction, it is possible to optimally control the picture quality according to the effect of the signal level correction, to thereby create an image having high picture quality and high visibility at a low cost.

Embodiment 4

FIG. 15 schematically shows an imaging apparatus according to a fourth embodiment of the present invention. The imaging apparatus of FIG. 15 includes an imaging unit 1501, a camera signal processing unit 1502, an exposure quantity detecting unit 1502_1, a digital gain unit 1502_2, a noise correcting unit 1502_3, an image signal correcting unit 1503, a statistic information acquiring unit 1504, a signal correction intensity control unit 1505, a signal extension estimating unit 1506, a noise correction intensity control unit 1507, a signal extension estimation information storage 1508, and an exposure control unit 1512.

In the imaging apparatus shown in FIG. 15, the imaging unit 1501 includes, according to necessity, a lens group including a zoom lens and a focus lens, an iris, a shutter, an imaging element such as a Charge-Coupled Device (CCD) or a Complementary Metal Oxide Semiconductor (CMOS), a Cadmium Sulfide (CDS) and an Automatic Gain Control (AGC), and an Analog-Digital (AD) converter. The imaging unit 1501 receives light by the imaging element and then converts an optical image of the light into an electric signal, to thereby output an image signal therefrom.

The camera signal processing unit 1502 includes at least an exposure quantity detecting unit 1502_1, a digital gain unit 1502_2, and a noise correcting unit 1502_3. For an image signal inputted from the imaging unit 1501, the camera signal processing unit 1502 executes detecting processing, digital gain processing, and noise correction processing for an evaluation value of the exposure quantity, to resultantly produce an image signal. It is also possible to improve the picture quality and to provide additional functions by executing various digital signal processings such as separation processing to separate the image signal into a luminance signal and a color signal, edge emphasis processing, gamma processing, color difference conversion processing, white balance correction processing, and digital zoom processing. Coefficients for each signal processing, for example, a brightness correction quantity and a gamma characteristic may be beforehand set to be stored in a nonvolatile memory for uses in an actual operation. Or, the control value may be varied based on various information pieces such as a luminance distribution detected by using the image signal.

The image signal correcting unit 1503 determines the input/output characteristic of the image signal based on the correction intensity of the signal level correction outputted from the signal correction intensity control unit 1505 and corrects, based on the input/output characteristic, the signal level as the signal value of each pixel of the image signal inputted from the camera signal processing unit 1502, to thereby create an output signal. The image signal correction conducted by the image signal correcting unit 1503 includes backlight correction, fog and haze correction, and wide dynamic range processing implemented by correcting the signal level, which are realized as below. For example, a correspondence between input values and output values is beforehand kept as coefficients of a function or a lookup table. Based on the correction intensity of signal level correction, the values of the coefficients of a function or the lookup table are corrected to determine the input/output characteristic. Based on the input/output characteristic, the signal level of the image signal is converted. It is also possible to beforehand keep a plurality of sets of coefficients of a function or correspondence lookup tables for the corrections corresponding to a plurality of correction intensity values. In operation, based on the correction intensity outputted from the signal correction intensity control unit 1505, a set of coefficients of a function or a correspondence lookup table is selected or is employed through interpolation, to thereby reduce the operation cost. It is also possible that the image signal to be inputted is separated into a plurality of components and mutually different processings are executed for the components, and then resultant signals are combined with each other. For example, the input signal is separated through preprocessing into a low-frequency component and a high-frequency component and mutually different signal level correction processings are executed for the respective components. This makes it possible to correct brightness of an associated subject and minuteness of edges. It is also possible that by executing the signal level correction processing by use of an input/output characteristic different for each region of the image signal, the correction is optimally carried out for each subject in the image. The processing may be executed for the luminance signal and the color signal of the image signal by employing different characteristics. Or, the processing may be executed only for either one thereof, to optimize the performance and calculation cost.

The statistic information acquiring unit 1504 receives the image signal from the noise correcting unit 1502 and measures statistic information of the signal value, to output the measured result therefrom. The statistic information includes, for example, a histogram distribution of signal values of respective pixels in the image signal and statistic quantities such as a mean value, a maximum value, a minimum value, and a standard deviation. The statistic information is used when the signal correction intensity control unit 1505 judges a scene in the image signal to obtain appropriate correction intensity for the image signal correcting unit 1503 to correct the signal level. It is also possible to obtain statistic information of signal values of pixels in a predetermined region of the image signal, to obtain statistic information of signal values of pixels in a region including a subject which is detected by image recognition, or to obtain statistic information for only pixels having a signal value of a predetermined range, to thereby improve scene judge performance to judge scenes. For example, when the image signal correcting unit 1503 executes the signal range correction processing by use of an input/output characteristic different for each region of the image signal, it is possible to optimally execute the signal range correction processing for each region by obtaining statistic information in units associated with the region.

The signal correction intensity control unit 1505 judges a scene in the image signal based on the statistic information from the statistic information acquiring unit 1504, to determine correction intensity for the image signal correcting unit 1503 to correct the signal level. When the image signal correcting unit 1503 executes the signal range correction processing by use of an input/output characteristic different for each region of the image signal, it is also possible to acquire statistic information measured by the signal correction intensity control unit 1505 in units associated with the region, to thereby determine the correction intensity for each region. There may also be employed a configuration in which the statistic information acquiring unit 1504 is in the camera signal processing unit 1502 and the statistic information is acquired from the image signal inputted from the imaging unit 1501 or from an image signal at an intermediate point of the digital signal processing. In this case, the statistic information to be used to control various signal processings in the camera signal processing unit 1502 may be employed also to control the correction intensity of the signal level correction processing in the image signal correcting unit 1503, to thereby reduce the cost. It is also possible that the signal correction intensity control unit 1505 determines, without using the statistic information outputted from the statistic information acquiring unit 1504, a value inputted from an input unit, not shown, as the correction intensity of the signal level correction processing. In this situation, although the correction intensity cannot be controlled in association with a scene in the image signal, the statistic information acquiring unit 1504 may be dispensed with. Hence, when the system is implemented by software, the calculation time is reduced, and when the system is implemented by hardware, the development cost is reduced. It is also possible that the correction intensity determined by the signal correction intensity control unit 1505 is further corrected by use of the exposure control information from the exposure control unit 1512, and the final correction intensity thus obtained is outputted as the control value. As a result, the correction intensity of the signal level correction processing in the image signal correcting unit 1503 can be controlled in association with the state of the exposure control and the scene in the image signal. The control method of controlling the correction intensity of the signal level correction processing in the image signal correcting unit 1503 will be described later by referring to FIG. 19.

The signal extension estimating unit 1506 estimates a signal extension degree which is an evaluation value indicating a degree of magnification of the signal magnified by the signal level correction conducted by the image signal correcting unit 0103, based on the correction intensity determined by the signal correction intensity control unit 1505 and the signal extension estimation information obtained from signal extension estimation information storage 1508. The signal extension estimation information storage 1508 corresponds to a ROM, a nonvolatile memory, and a recording medium on a program and is employed to store therein signal extension estimation information for the signal extension estimating unit 1506 to estimate, based on the correction intensity of the signal level correction determined by the signal correction intensity control unit 1505, the signal extension degree, which is used by the image signal correcting unit 1503 to conduct the signal level correction. For the signal extension estimation information, if the input/output characteristic of the signal level correction in the image signal correcting unit 1503 is known, it is only required to beforehand obtain and store the signal extension estimation degree in association with the input/output characteristic. If the input/output characteristic is unknown, it s only required to beforehand obtain and store an estimation value estimated through calibration.

The noise correction intensity control unit 1507 determines and controls the correction intensity in the noise correction processing of the noise correcting unit 1502_3 based on the signal extension degree estimated by the signal extension estimating unit 1506 and the exposure control information acquired from the exposure control unit 1512. By conducting the noise correction based on the correction intensity, the noise correcting unit 15023 is able to carry out the noise correction according to the correction intensity for the signal level correction processing of the image signal correcting unit 1503. The exposure control unit 1512 obtains an evaluation value of the quantity of light from the exposure quantity detecting unit 1502_1 and controls, to make the actual exposure quantity approach a predetermined value as a target, the state of the iris and the shutter timing in the imaging unit 1501, and the analog gain quantity of AGC and the digital gain quantity in the digital gain unit 1502_2. Also, the exposure control unit 1512 produces exposure control information such as the opening degree of the iris, a period of time in which the shutter is kept open, the analog gain quantity, the digital gain quantity, and/or the signal amplification factor associated with the analog gain and the digital gain. Hence, the noise correction intensity control unit 1507 is able to optimally control the correction intensity for the noise correction in association with both of the signal amplification through exposure control and the signal extension through the signal level correction processing, to thereby improve the picture quality. There may also be employed a configuration in which in association with the exposure control information and the correction intensity of the signal range correction processing, the noise correction intensity control unit 1507 controls not only the correction intensity of the noise correction processing in the camera signal processing unit 1502 but also the effect of various signal processings such as the emphasis intensity of the edge emphasis processing and the gamma correction intensity of the gamma processing, to thereby optimally control the picture quality of the overall signal processing in association with the exposure control and the signal range correction processing. For example, the camera signal processing, the signal level correction processing, and the statistic information acquisition processing are executed by a DSP, a dedicated LSI unit, or the like. The correction intensity control processing of the signal level correction, the signal extension degree estimation processing, the correction intensity control processing of the noise correction, and the exposure control processing are executed by a microcomputer or the like.

Figure 16A:
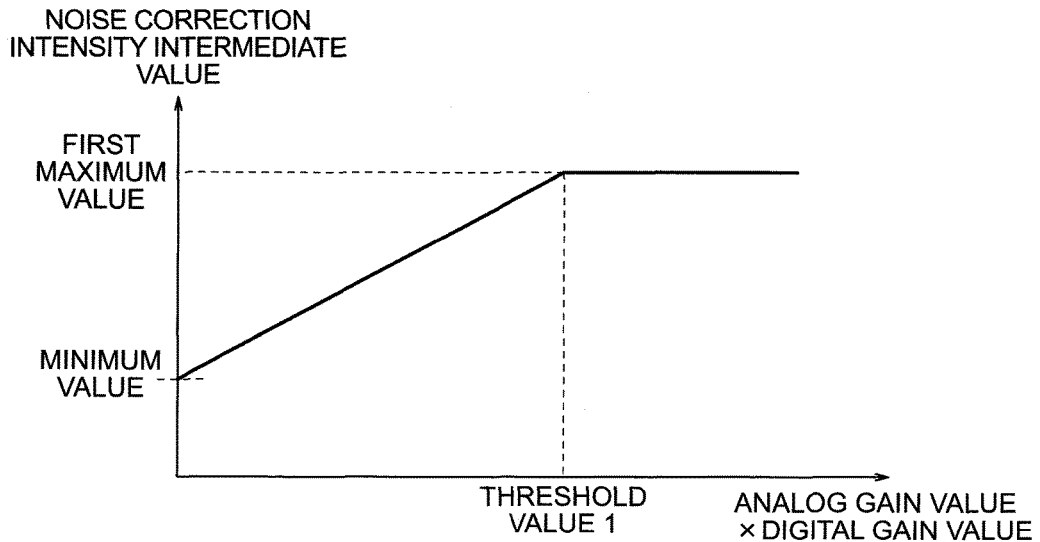
FIG. 16A is a diagram graphically showing an example of a control method of a correction intensity intermediate value for noise correction based on exposure control information according to the fourth embodiment.
Figure 16B:
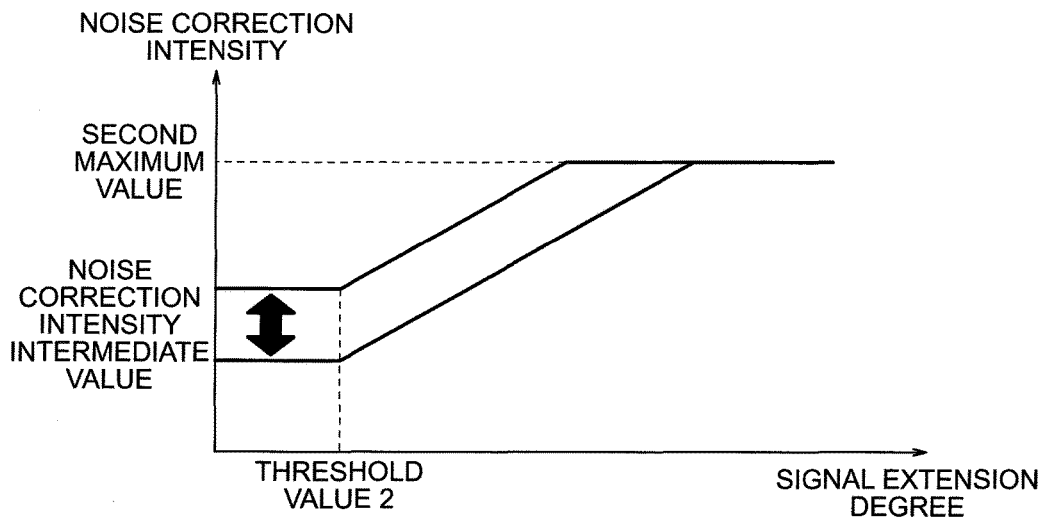
FIG. 16B is a diagram showing an example of a correction intensity control method of correcting noise based on a signal extension degree according to the fourth embodiment.
Figure 16C:
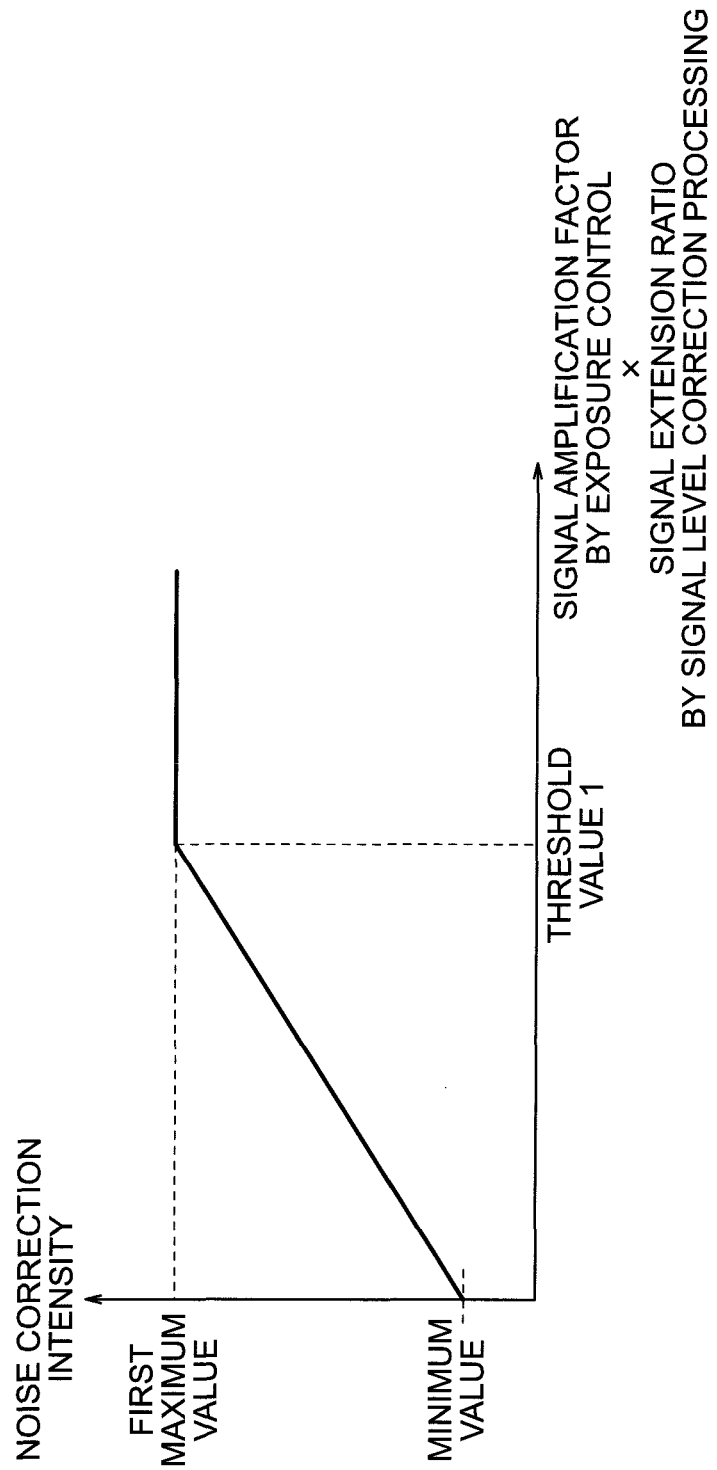
FIG. 16C is a diagram showing an example of a correction intensity control method of correcting noise based on a signal extension degree and exposure control information according to the fourth embodiment.

FIGS. 16A to 16C are first diagrams showing examples of the correction intensity control method for the noise correction according to the fourth embodiment. FIG. 16A shows an example of the control method of a correction intensity intermediate value for noise correction based on exposure control information. FIG. 16B shows an example of the correction intensity control method for noise correction based on the signal extension degree. FIG. 16C shows an example of the correction intensity control method for the noise correction based on the exposure control information and the signal extension degree. In accordance with the present invention, the correction intensity control processing for noise correction is executed by the noise correction intensity control unit 1507.

As FIG. 16A shows, the noise correction intensity control unit 1507 controls an intermediate value of the correction intensity of the noise correction processing in the noise correcting unit 1502_3 based on the exposure control information from the exposure control unit 1512. The intermediate value of the correction intensity of the noise correction processing is increased as the signal amplification factor due to the analog gain and the digital gain becomes larger. Hence, when a scene to be shot is not fully bright and the exposure control unit 1512 performs control to increase the gain quantity, it is possible to suppress, by enhancing the noise correction effect according to the gain quantity, reduction in the picture quality due to simultaneous emphasis of the noise component. As FIG. 16B shows, the noise correction intensity control unit 1507 controls the correction intensity of the noise correction processing, by using, as a reference, the intermediate value of the correction intensity of the noise correction processing calculated by using the exposure control information and further based on the signal extension degree from the signal extension estimating unit 1506. Hence, it is possible to conduct the noise correction in association with the exposure control if the correction intensity of the noise correction processing has a small value. It is possible to conduct the noise correction in association with the exposure control and the signal level correction processing if the correction intensity of the noise correction processing has a large value. As FIG. 16C shows, when the signal amplification factor due to the analog gain and the digital gain is calculated and is obtained as exposure control information and the signal extension degree due to the signal level correction processing is calculated and is obtained as the signal extension degree, the respective information pieces may be processed in same units. Hence, the control operation may be conducted such that without calculating the intermediate value of the noise correction processing, the correction intensity of the noise correction processing is directly determined at once based on the signal amplification factor due to the overall processing. This simplifies the control operation.

Figure 17A:
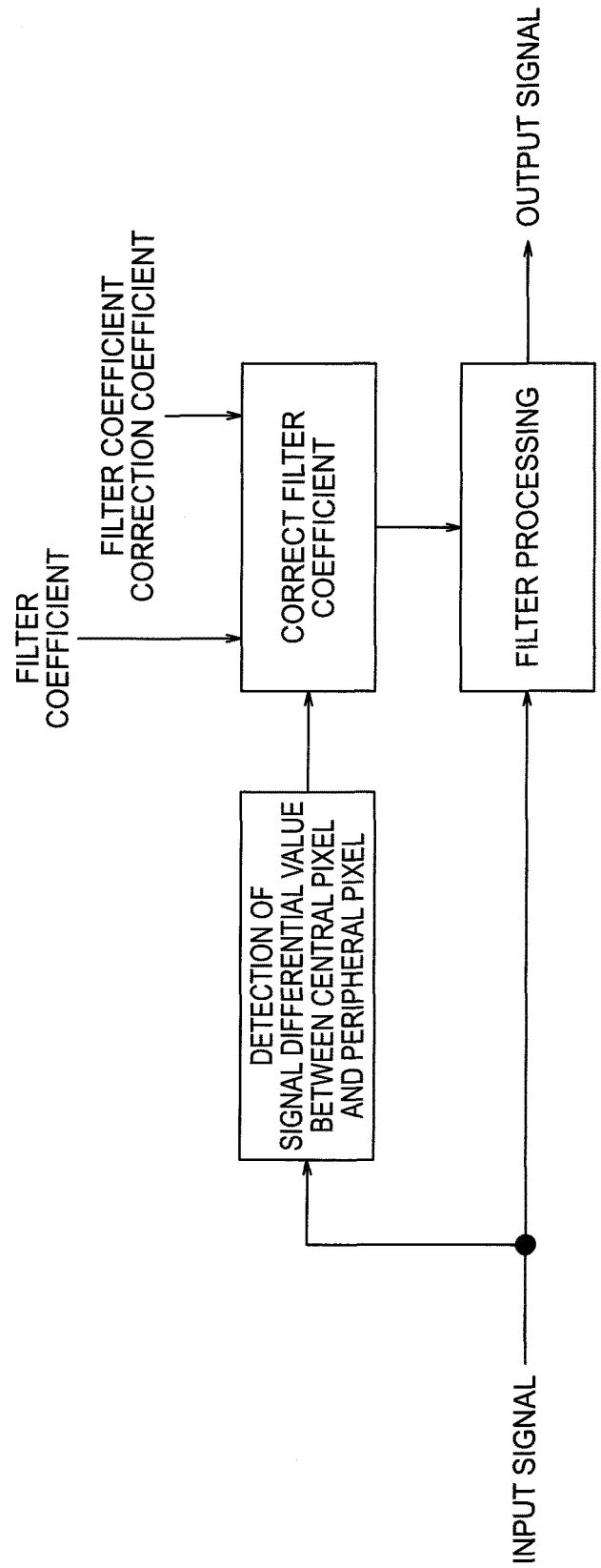
FIG. 17A is a diagram showing an example of noise correction processing employing a bilateral filter according to the fourth embodiment.
Figure 17B:
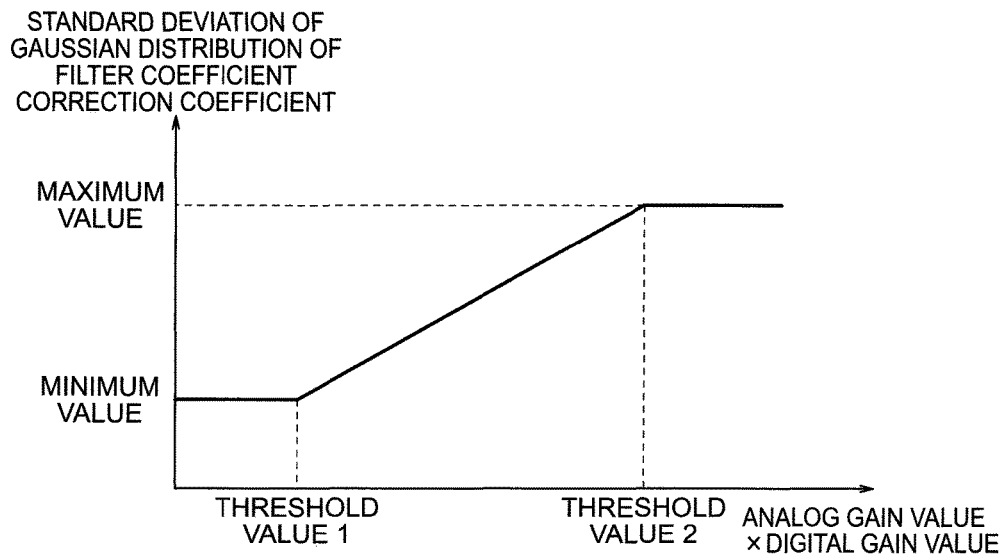
FIG. 17B is a diagram graphically showing an example of a noise judge magnitude control method for noise correction using a bilateral filter according to the fourth embodiment.
Figure 17C:
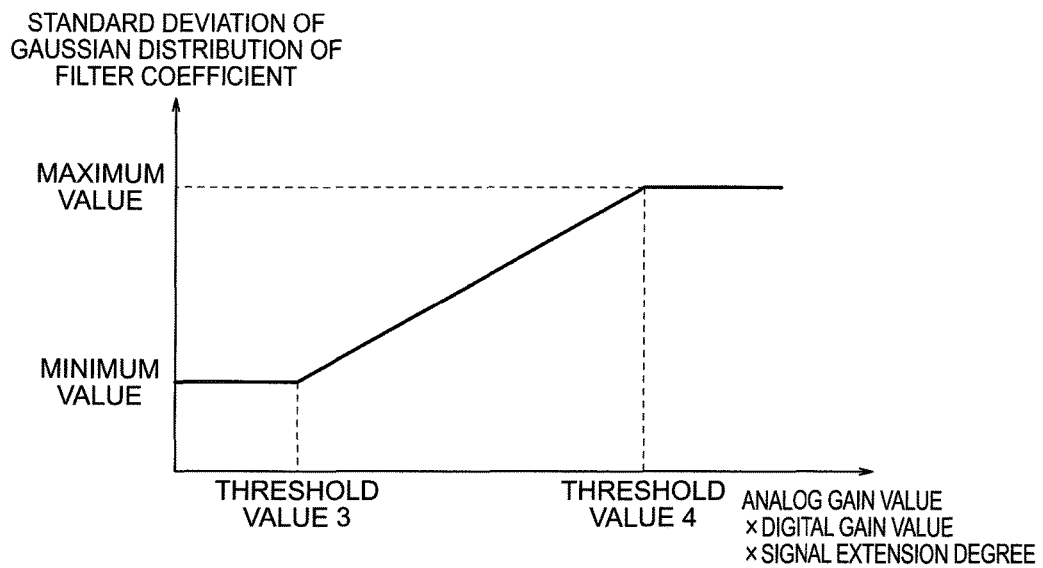
FIG. 17C is a diagram showing an example of a correction intensity control method for noise correction by a bilateral filter according to the fourth embodiment.

FIGS. 17A to 17C are second diagrams showing an example of the noise correction processing according to the fourth embodiment. In the example, the noise correcting unit 1502_3 executes, as the noise correction processing, two-dimensional noise correction processing by use of a bilateral filter. FIG. 17A is an example of the noise correction processing to be executed by use of a bilateral filter. FIG. 17B shows an example of a noise judge magnitude control method for the noise correction using a bilateral filter. FIG. 17C shows an example of a correction intensity control method for the noise correction using a bilateral filter. In accordance with the present invention, the correction intensity control processing for the noise correction is executed by the noise correction intensity control unit 1507.

As FIG. 17A shows, the noise correcting unit 1502_3 executes, as the noise correction processing, two-dimensional noise correction processing by using a bilateral filter, specifically, executes filter processing based on a predetermined filter coefficient for the input image signal to correct noise, to thereby create an output image signal. The bilateral filter is known as a spatial filter of edge preserving type. When the bilateral filter is provided with a filter coefficient having a weight conforming to the Gaussian distribution in accordance with distance from a pixel under consideration and a filter coefficient correction coefficient having a weight conforming to the Gaussian distribution in accordance with the luminance difference from the pixel under consideration, it is possible to vary the smoothing effect of the filter according to noise likelihood of the subject. In the operation, by changing the smoothing effect for the noise correction by altering the standard deviation of the Gaussian distribution of the filter coefficient and by changing the standard deviation of the Gaussian distribution of the filter coefficient correction coefficient, it is possible to vary the magnitude of the judgment of noise likelihood. As FIG. 17B shows, the noise correction intensity control unit 1507 determines that the standard deviation of the Gaussian distribution of the filter coefficient correction coefficient is increased as the signal amplification factor due to the analog gain and the digital gain becomes larger. As a result of the exposure control, the magnitude of the noise judgment can be controlled according to the degree of emphasis of noise in the image signal as an input to the noise correcting unit 1502_3. As FIG. 17C shows, the noise correction intensity control unit 1507 determines that the standard deviation of the Gaussian distribution of the filter coefficient is increased as the signal amplification factor due to the analog gain and the digital gain and the signal extension degree due to the signal level correction processing become larger. It is hence possible to suppress reduction in the picture quality due to simultaneous emphasis of the noise component by enhancing the noise correction effect according to both of the analog and digital gain quantities and the signal extension degree of the signal level correction processing. As above, even when the noise correction of edge preserving type is carried out, the noise correction processing can be appropriately executed in association with the exposure control and the signal range correction processing. Although FIGS. 17A to 17C show, as an example, the noise correction processing to be executed by using a bilateral filter, even in the noise correction processing of another edge preserving type, a similar advantage is expectable when the evaluation value for the noise judgment is controlled based on the exposure control information and the correction intensity of the noise correction is controlled according to the exposure control information and the correction intensity of the signal range correction processing.

Figure 18A:
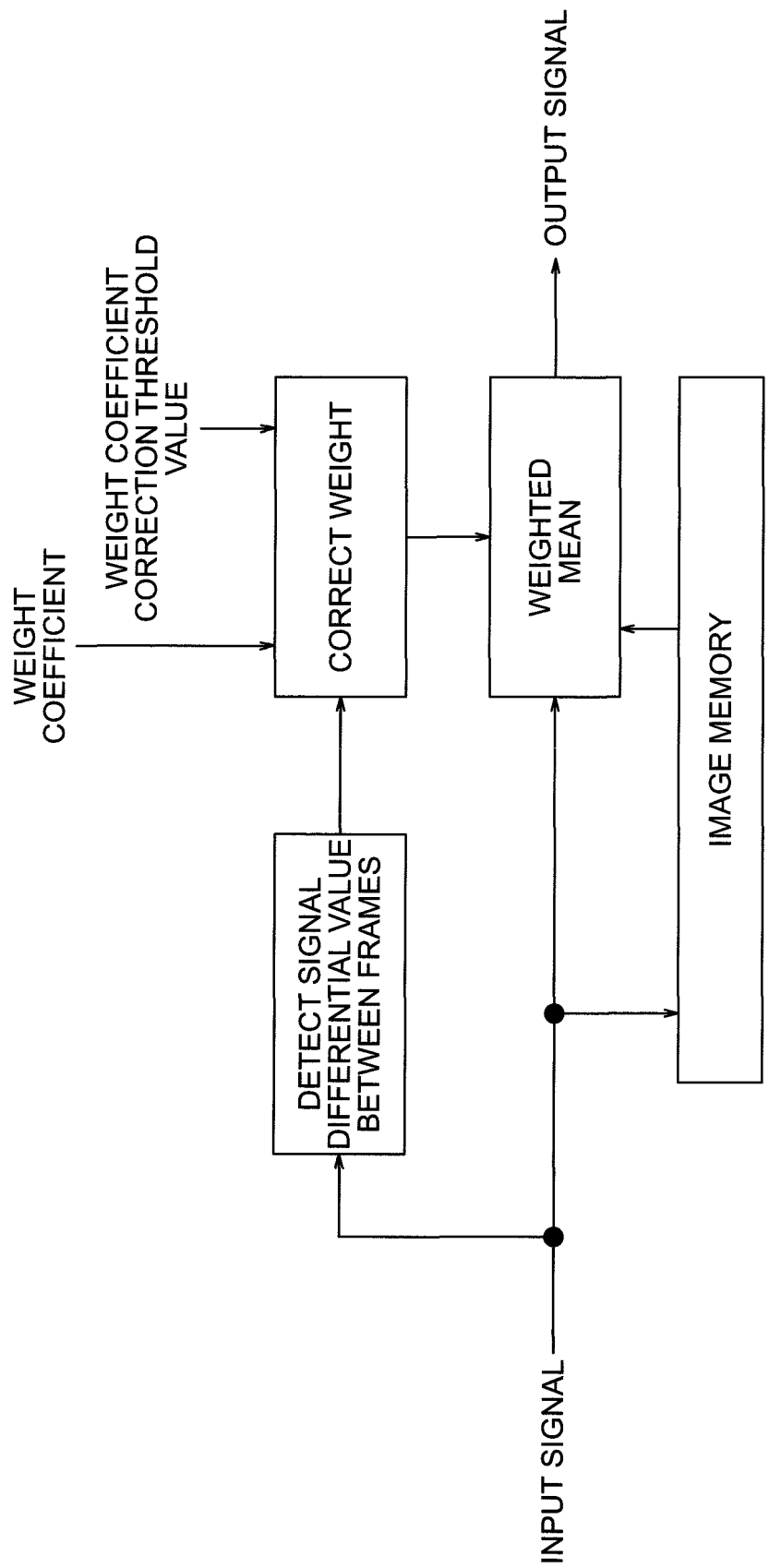
FIG. 18A is a diagram showing an example of three-dimensional noise correction processing of movement adaptive type according to the fourth embodiment.
Figure 18B:
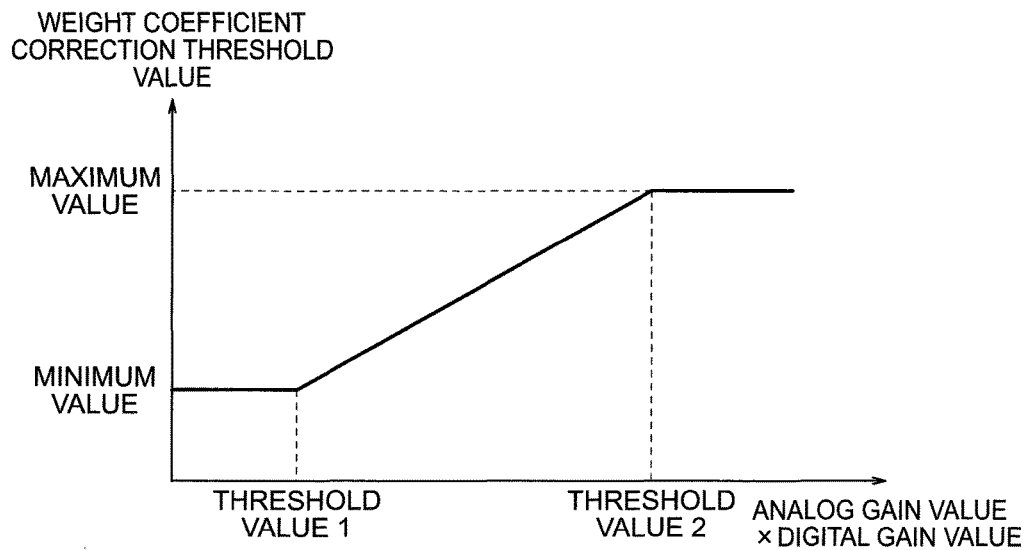
FIG. 18B is a diagram graphically showing an example of a noise judge magnitude control method for three-dimensional noise correction of movement adaptive type according to the fourth embodiment.
Figure 18C:
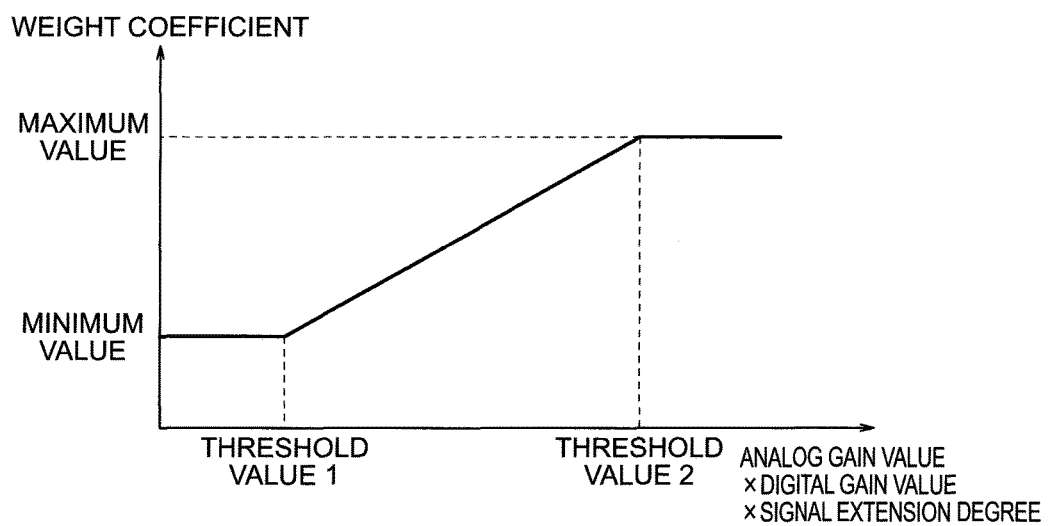
FIG. 18C is a diagram showing an example of a correction intensity control method for three-dimensional noise correction of movement adaptive type according to the fourth embodiment.

FIGS. 18A to 18C are diagrams showing an example of the correction intensity control method for the noise correction according to the fourth embodiment. In the example of FIGS. 18A to 18C, the noise correcting unit 15023 executes, as the noise correction processing, three-dimensional noise correction processing of movement adaptive type. FIG. 18A is an example of three-dimensional noise correction processing of movement adaptive type. FIG. 18B shows an example of a noise judge magnitude control method for three-dimensional noise correction of movement adaptive type. FIG. 18C shows an example of the correction intensity control method for three-dimensional noise correction of movement adaptive type. In accordance with the present invention, the correction intensity control processing for the noise correction is executed in the noise correction intensity control unit 1507.

As FIG. 18A shows, when the noise correcting unit 1502_3 executes, as the noise correction processing, the three-dimensional noise correction of movement adaptive type, it corrects noise by conducting an operation to obtain a weighted mean with a predetermined weight coefficient for an input image signal via the image memory, specifically, for an image signal of the image in consideration and one or more different image signals associated with one and the same scene in the continuous time axis, to thereby create an output image signal. In the operation, by changing the weight coefficient according to the differential value of the signal value between frames for each pixel, it is possible to separate the change in the signal value due to the movement of the subject, to thereby effectively correct the random noise. The weight coefficient may be changed according to the differential value of the signal value between frames for each pixel and the correlation between pixel values of the pixel in consideration and its peripheral pixels. In this situation, by varying the noise correction effect by changing the weight coefficient of the pixel in consideration, and by varying the control threshold value of the differential value of the signal quantities as the reference to correct the weight coefficient, it is possible to vary the magnitude of judgment for the noise likelihood.

As FIG. 18B shows, the noise correction intensity control unit 1507 determines that the weight coefficient correction threshold value is increased as the signal amplification factor due to the analog gain and the digital gain becomes larger. As a result of the exposure control, the noise judgment magnitude can be controlled according to the emphasis degree of the noise in the image signal as an input to the noise correcting unit 1502_3.

As FIG. 18C shows, the noise correction intensity control unit 1507 determines that the weight coefficient is increased as the signal amplification factor due to the analog gain and the digital gain and the signal extension degree due to the signal level correction processing become larger. It is hence possible to suppress reduction in the picture quality due to simultaneous emphasis of the noise component by enhancing the noise correction effect according to the analog gain quantity, the digital gain quantity, and the signal extension degree of the signal level correction processing. As above, even when the three-dimensional noise correction of movement adaptive type is carried out, the noise correction processing can be appropriately executed in association with the exposure control and the signal range correction processing.

Figure 19:
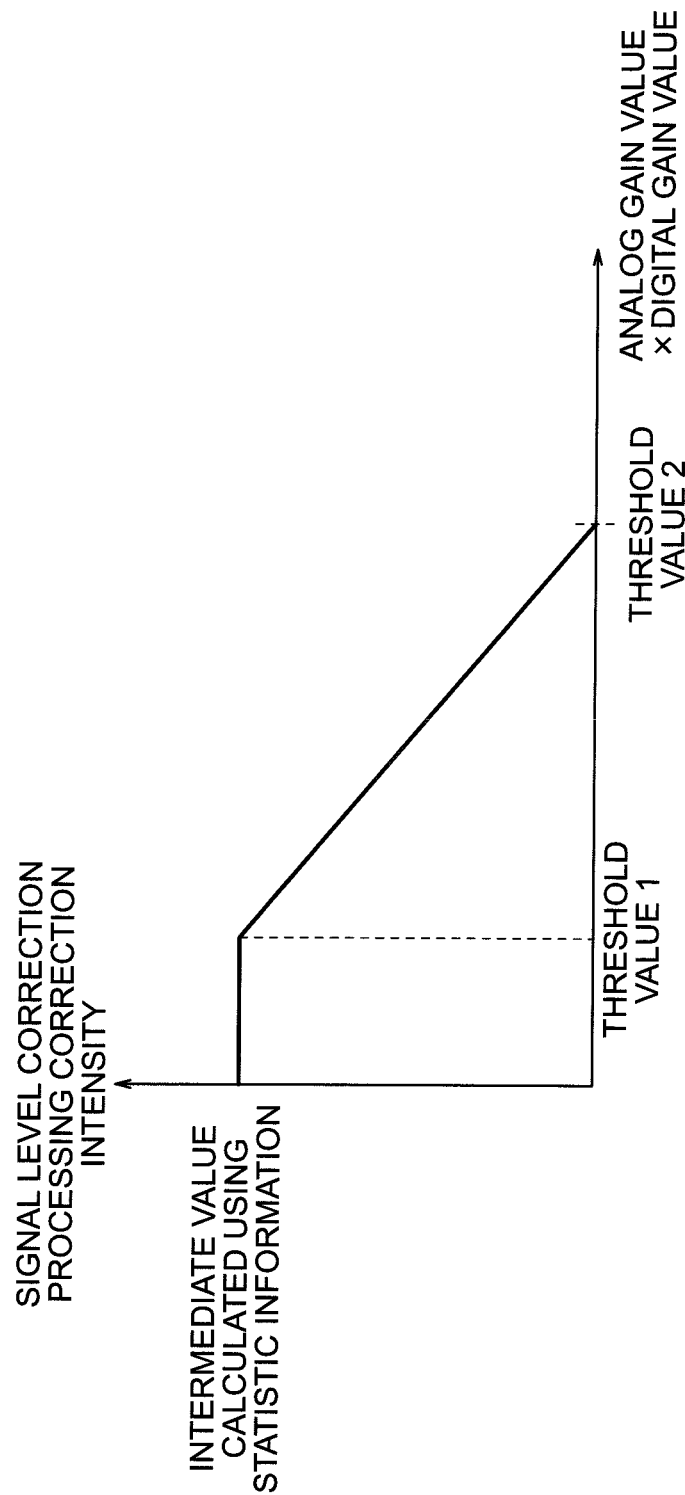
FIG. 19 is a diagram graphically showing an example of a correction intensity control method for signal range correction processing according to the fourth embodiment.

FIG. 19 shows an example of the correction intensity control method for the signal range correction processing according to the fourth embodiment. In the present invention, the correction intensity control processing for the signal range correction processing is executed by the signal correction intensity control unit 1505.

As FIG. 19 shows, for the intermediate value of the correction intensity of the signal range correction processing determined based on the statistic information from the statistic information storage 1504, the signal correction intensity control unit 1505 conducts correction according to the exposure control information to determine and to output the final correction intensity therefrom. For example, in the control operation, if the analog gain quantity and the digital gain quantity due to the exposure control are small, the control value determined based on the statistic information is directly employed. As the analog gain quantity and the digital gain quantity become larger, the control operation is performed such that the value is reduced by using, as the reference, the control value determined based on the statistic information. As a result, when the noise correction processing cannot be fully executed for an image in which the analog gain quantity and the digital gain quantity are large and noise is remarkably emphasized, it is possible to prevent, by executing the signal level correction processing, reduction in visibility due to remarkable emphasis of noise. Further, since the signal extension degree estimated by the signal extension estimating unit 1506 is calculated in association with the correction intensity of the signal range correction processing, the correction intensity of the noise correction controlled by the noise correction intensity control unit 1507 is also determined in association with the correction intensity of the signal range correction processing. Since the correction intensity of the signal range correction processing are small when the analog gain quantity and the digital gain quantity are large, the correction intensity of the noise correction is controlled mainly depending on the analog gain quantity and the digital gain quantity. Hence, a similar advantage is obtained like in the case in which the signal range correction processing is not employed. Specifically, there is obtained picture quality equivalent to that obtained in the case in which the functions employing the signal range correction processing are not used. In conjunction with this example, description has been given of a method in which the correction intensity of the signal range correction processing is reduced as the analog gain quantity and the digital gain quantity become larger. However, the control operation may be carried out to reduce the correction intensity of the signal range correction processing and the noise correction intensity based on the statistic information. For example, if the mean luminance in the image signal is less than a predetermined threshold value; or, in a configuration in which statistic information is obtainable for each region of the image signal, if the number of regions in which the mean luminance of each region is less than a predetermined threshold value is equal to or more than a predetermined value, it is possible, by reducing the correction intensity of the signal range correction processing, to prevent the noise from being too much emphasized through the signal level correction processing.

According to the present embodiment, by determining the correction intensity of the noise correction based on the control information of the correction intensity for the signal level correction and the exposure control information, the noise correction is optimally carried out according to the state of exposure and the effect of the signal level correction. It is hence possible to create an image having high picture quality and high visibility at a low cost.

Embodiment 5

Figure 20:
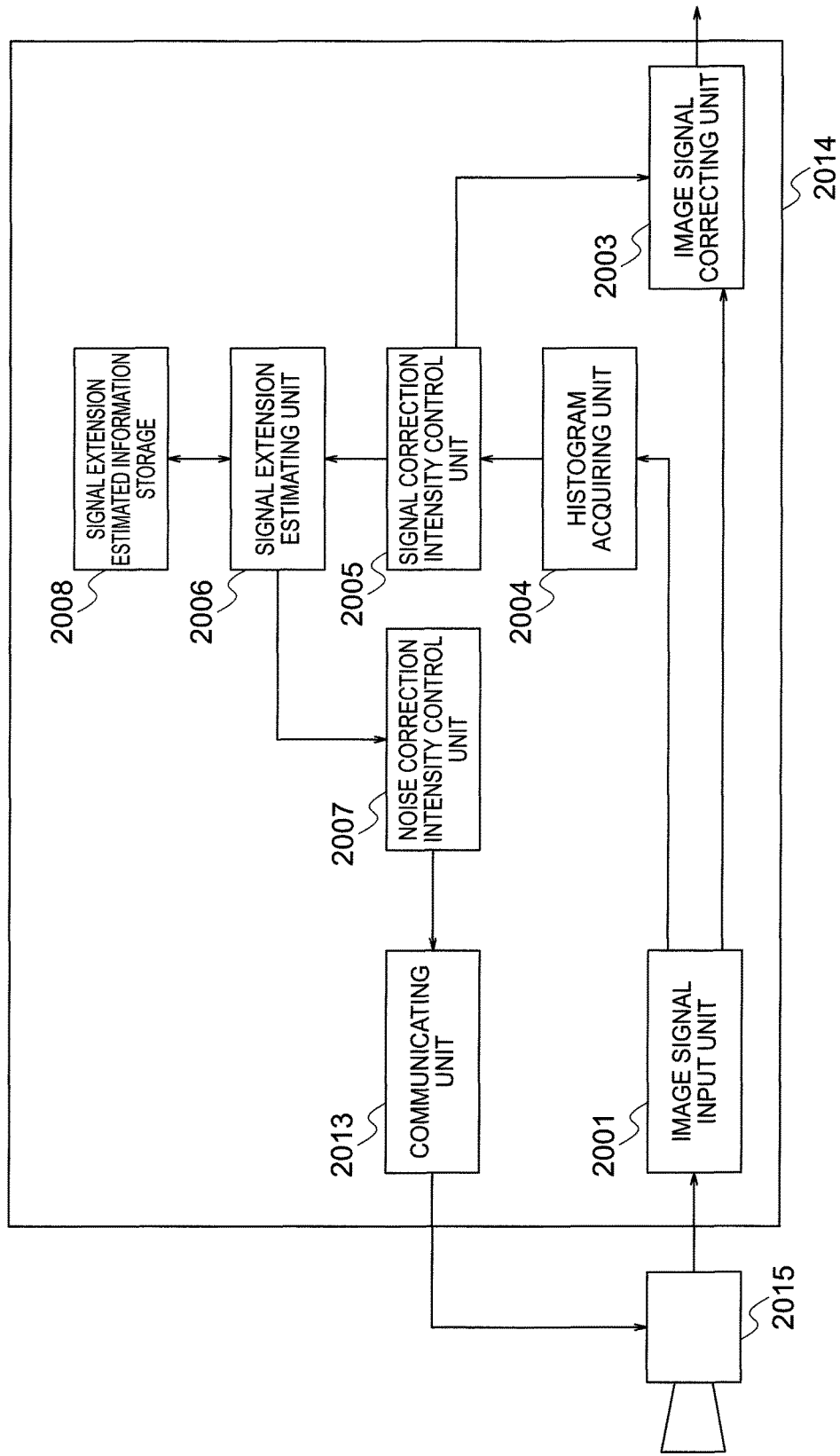
FIG. 20 is a diagram showing an example of an emphasis intensity control method for edge emphasis according to a fifth embodiment of the present invention.

FIG. 20 shows an example of the image signal processing apparatus and the imaging apparatus according to a fifth embodiment of the present invention. The configuration of FIG. 20 includes an image signal input unit 2001, an image signal correcting unit 2003, a statistic information acquiring unit 2004, a signal correction intensity control unit 2005, a signal extension estimating unit 2006, a noise correction intensity control unit 2007, a signal extension estimation information storage 2008, a communicating unit 2013, an image signal processing apparatus 2014 including an image processing program to implement the units ranging from the image signal input unit 2001 to the signal extension estimation information storage 2008, and an imaging apparatus 2015 including a noise correction adjusting function according to necessity. The image signal processing apparatus shown in FIG. 20 mainly differs from that shown in FIG. 1 in that the noise correction processing is executed in the imaging apparatus 2015 including the noise correction adjusting function, not in the image signal processing apparatus 2014. It is possible to transmit, as the adjusting value, the correction intensity degree of the noise correction processing from the image signal processing apparatus 2014 via the communication unit 2013 to the imaging apparatus 2015.

In the image signal processing apparatus shown in FIG. 20, the image signal input unit 2001 connects to the imaging apparatus 2015 including the noise correction adjusting function via a capture board, a LAN, a USB, or the like connected to a video cable, to receive an image signal produced by the imaging apparatus 2015. The image signal correcting unit 2003 determines an input/output characteristic of the image signal based on correction intensity of the signal level correction outputted from the signal correction intensity control unit 2005 and corrects, based on the input/output characteristic, a signal level as the signal value of each pixel of the image signal inputted from the image signal input unit 2001, to thereby create an output signal. The statistic information acquiring unit 2004 receives the image signal from the image signal input unit 2001 and measures statistic information of the signal value, to output the measured result therefrom. The noise correction intensity control unit 2007 determines the noise correction adjusting value of the imaging apparatus 2015 based on the signal extension degree estimated by the signal extension estimating unit 2006, to output the noise correction adjusting value to the communicating unit 2013. The communicating unit 2013 conducts communication via a serial port, a parallel port, a LAN, and the like to transmit the noise correction adjusting value to the imaging apparatus 2015. Hence, even in an apparatus in which an imaging apparatus to execute the camera signal processing including the noise correction processing differs from the image signal processing apparatus to execute the signal level correction processing, the noise correction is optimally carried out according to the correction intensity of the signal level correction processing. It is hence possible to create an image having high picture quality and high visibility at a low cost.

It should be understood that the present invention is not limited to the specific embodiments described in this specification and includes various variations thereof. For example, the embodiments have been described in detail to easily explain the present invention and the present invention is not limited to an embodiment including all constituent components of those described above. As for the embodiments, part of the configuration of an embodiment may be replaced by the configuration of another embodiment and/or the configuration of an embodiment may be added to that of another embodiment. The present invention is applicable to an imaging apparatus, a Personal Computer (PC) application, an image processing apparatus, and the like in the utilization fields for consumers, monitoring, automobiles, business, and the like. However, the present invention is not limited to these utilization fields.

The invention claimed is:

1. An image signal processing apparatus, comprising:
an image signal input unit which inputs an image signal;
an image signal correction intensity control unit which determines a signal level correction intensity of the image signal;
a signal extension estimating unit which estimates a signal extension degree of a signal level correction processing based on the signal level correction intensity;
a noise correction intensity control unit which adjusts a value of a noise correction intensity based on the signal extension degree;
a noise correcting unit which conducts a noise correction processing for the image signal based on the noise correction intensity; and
an image signal correcting unit which conducts a signal level correction processing based on the signal level correction intensity for the image signal on which the noise correction processing has been conducted, wherein the signal level correction processing comprises:
in response to a determination that the signal level correction intensity exceeds a predetermined threshold value, increasing a magnification factor of the signal range, wherein the signal range is a difference between a maximum value and a minimum value of the luminance signal of the image signal; and
in response to a determination that the signal level correction intensity is lesser than the predetermined threshold value, decreasing the magnification factor of the signal range.

2. The image signal processing apparatus according to claim 1, wherein the image signal correction intensity controlling unit determines the signal level correction intensity such that the signal extension degree of a luminance range of an object in the image signal is bigger as the luminance range of the object is narrower.

3. The image signal processing apparatus according to claim 1, further comprising a signal extension estimation information storage which stores therein signal extension estimation information, wherein the signal extension estimating unit estimates the signal extension degree based on the signal extension estimation information and the signal level correction intensity.

4. The image signal processing apparatus according to claim 3, wherein the signal extension estimation information is a ratio between an input value and an output value of the signal level in the input/output characteristic of the signal level correction processing for a reference image signal correction.

5. The image signal processing apparatus according to claim 3, wherein the signal extension estimation information is a ratio between a differential value of input values and a differential value of output values between two signal levels in the input/output characteristic of the signal level correction processing for a reference image signal correction.

6. The image signal processing apparatus according to claim 1, further including a statistic information acquiring unit which calculates a distribution or a statistic quantity of a signal value for each desired region of the input image signal as statistic information,
wherein the image signal correction intensity control unit determines the signal level correction intensity of each desired region based on the statistic information,
the image signal correction unit conducts the signal level correction process based on the signal level correction intensity of each desired region,
the signal extension estimating unit selects a predetermined signal extension degree among the signal extension degrees of desired regions estimated from the signal level correction intensities for the desired regions, and
the noise correction intensity control unit determines the noise correction intensity from the predetermined signal extension degree.

7. The image signal processing apparatus according to claim 6, wherein the signal extension estimating unit selects one of an average value of the signal extension degrees, N-th biggest value, maximum value, a weighted mean value in which the values are weighted according to positions and a median, which are obtained from the signal extension degrees for desired regions, as the predetermined signal extension degree.

8. The image signal processing apparatus according to claim 1, wherein the image signal correcting unit consists of a plurality of image signal correction parts which respectively perform signal level correction processing with input/output characteristics different for each image signal output from the noise correction unit,
the image signal correction intensity control unit determines respective signal level correction intensities for the plurality of image signal correction parts,
the signal extension estimating unit estimates respective signal extension degrees based on the respective signal level correction intensities, and
the noise correction control unit determines the noise correction intensity by combining the respective signal extension degrees.

9. The image signal processing apparatus according to claim 8, further comprising a plurality of statistic information acquiring parts each of which calculates, as statistic information, a distribution or a statistic quantity of a signal value of the image signal inputted to each of the image signal correcting parts,
wherein the image signal correction intensity control part controls the signal level correction intensities in corresponding one of the image signal correcting parts based on the statistic information calculated by the plurality of statistic information acquiring parts.

10. The image signal processing apparatus according to claim 1, wherein the noise correction processing in the noise correcting unit is at least either one of two-dimensional correction processing to conduct the noise correction based on a correlation of a signal level between a pixel in consideration in the image signal and a peripheral pixel in the periphery of the pixel in consideration, three-dimensional correction processing to conduct the noise correction based on a correlation of a signal level of a pixel in consideration between images successive in a time axis, and edge emphasizing processing to make edge emphasizing correction intensity smaller in edge emphasizing.

11. The image signal processing apparatus according to claim 10, wherein when the noise correcting unit conducts, as the noise correction processing, at least two processing in the two-dimensional correction processing, the three-dimensional correction processing, and the noise emphasizing processing, the noise correction intensity control unit respectively determines the correction intensities of the noise correction processing to be conducted among the two-dimensional correction processing, the three-dimensional correction processing, and the edge emphasizing processing.

12. The image signal processing apparatus according to claim 1, further comprising:
an imaging unit which conducts an imaging operation to create an image signal to output the image signal therefrom;
an exposure quantity detecting unit which detects an exposure quantity of the imaging unit; and
an exposure control unit which controls exposure of the imaging unit based on the exposure quantity detected by the exposure quantity detecting unit,
wherein the noise correction intensity control unit adjust the value of the noise correction intensity using the signal extension degree, and an exposure control degree in the exposure control unit.

13. The image signal processing apparatus according to claim 10, further comprising:
an imaging unit which conducts an imaging operation to create an image signal to output the image signal therefrom;

an exposure quantity detecting unit which detects an exposure quantity of the imaging unit; and an exposure control unit which controls exposure of the imaging unit based on the exposure quantity detected by the exposure quantity detecting unit, wherein the noise correcting unit conducts, in the two-dimensional correction processing, signal processing in which the noise correcting unit compares a degree of the correlation of a signal level between a pixel in consideration in the image signal with a reference value and determines presence or absence of noise correction for the pixel in consideration or changes a type of a correction method, and the noise correction intensity control unit controls the reference value by use of the exposure control degree in the exposure control unit, and determines the noise correction intensity by use of the signal extension degree and the exposure control degree.

14. The image signal processing apparatus according to claim 10, further comprising:

an imaging unit which conducts an imaging operation to create an image signal to output the image signal therefrom;

an exposure quantity detecting unit which detects an exposure quantity of the imaging unit; and an exposure control unit which controls exposure of the imaging unit based on the exposure quantity detected by the exposure quantity detecting unit, wherein the noise correcting unit conducts, in the three-dimensional correction processing, signal processing in which the noise correcting unit compares a degree of the correlation of a signal level of a pixel in consideration between images successive in a time axis or a degree of the correlation of a signal level between a pixel in consideration in the image signal with a reference value and determines presence or absence of noise correction for the pixel in consideration or changes a type of a correction method, and the noise correction intensity control unit controls the reference value by use of the exposure control degree in the exposure control unit, and determines the noise correction intensity by use of the signal extension degree and the exposure control degree.

15. The image signal processing apparatus according to claim 1, further comprising:

an imaging unit which conducts an imaging operation to create an image signal to output the image signal therefrom;

an exposure quantity detecting unit which detects an exposure quantity of the imaging unit; and an exposure control unit which controls exposure of the imaging unit based on the exposure quantity detected by the exposure quantity detecting unit, wherein the image signal correction intensity control unit determines the signal level correction intensity using the exposure control degree in the exposure control unit.

16. The image signal processing apparatus according to claim 15, wherein the image signal correction intensity control unit reduces the signal level correction intensity in a case that the exposure control unit conducts the exposure control so as to make a signal gain large.

17. A method of processing an image signal, the method comprising:

inputting an image signal;

determining a signal level correction intensity of the image signal;

estimating a signal extension degree of a signal level correction based on the signal level correction intensity;

adjusting a value of a noise correction intensity based on the signal extension degree;

performing noise correction processing for the image signal based on the noise correction intensity; and performing signal level correction processing based on the signal level correction intensity for the image signal on which the noise correction processing has been performed, wherein the signal level correction processing comprises:

in response to a determination that the signal level correction intensity exceeds a predetermined threshold value, increasing a magnification factor of the signal range, wherein the signal range is a difference between a maximum value and a minimum value of the luminance signal of the image signal; and in response to a determination that the signal level correction intensity is lesser than the predetermined threshold value, decreasing the magnification factor of the signal range.

18. The method according to claim 17, wherein the signal extension degree of a luminance range of an object in the image signal is bigger as the luminance range of the object is narrower.

19. The method according to claim 17, further stores signal extension estimation information, wherein the signal extension degree is estimated based on the signal extension estimation information and the signal level correction intensity.

20. The method according to claim 19, wherein the signal extension estimation information is a ratio between an input value and an output value of the signal level in an input/output characteristic of the signal level correction processing for a reference image signal correction.

21. The method according to claim 19, wherein the signal extension estimation information is a ratio between a differential value of input values and a differential value of output values between two signal levels in an input/output characteristic of the signal level correction processing for a reference image signal correction.

22. The method according to claim 17, further comprising:

calculating a distribution or a statistical quantity of a signal value for each desired region of the input image signal as statistical information;

determining the signal level correction intensity of each desired region based on the statistical information, wherein the signal level correction process is performed based on the signal level correction intensity of each desired region;

selecting a predetermined signal extension degree among the signal extension degrees of desired regions estimated from the signal level correction intensities for the desired regions, and determining the noise correction intensity from the predetermined signal extension degree.

23. The method according to claim 22, further comprising selecting one of an average value of the signal extension degrees, an N-th biggest value, a maximum value, a weighted mean value in which the values are weighted according to positions and a median, each of which is obtained from the signal extension degrees for desired regions, as the predetermined signal extension degree.

24. The method according to claim 17,
wherein the signal level correction processing is performed by a plurality of image signal correction parts of an image signal correcting unit with input/output characteristics that are different for each image signal on which noise correction is performed, the method further comprising:
determining respective signal level correction intensities for the plurality of image signal correction parts;
estimating respective signal extension degrees based on the respective signal level correction intensities; and
determining the noise correction intensity by combining the respective signal extension degrees.

25. The method according to claim 24, further comprising calculating, as statistical information, a distribution or a statistical quantity of a signal value of the image signal inputted to each of the image signal correcting parts; and
controlling the signal level correction intensities in a corresponding one of the image signal correcting parts based on the calculated statistical information.

26. The method according to claim 17, wherein the noise correction processing is at least either one of two-dimensional correction processing to conduct the noise correction based on a correlation of a signal level between a pixel in consideration in the image signal and a peripheral pixel in the periphery of the pixel in consideration, three-dimensional correction processing to conduct the noise correction based on a correlation of a signal level of a pixel in consideration between images successive in a time axis, and edge emphasizing processing to make edge emphasizing correction intensity smaller in edge emphasizing.

27. The method according to claim 26, further comprising:
performing, as the noise correction processing, at least two of: the two-dimensional correction processing, the three-dimensional correction processing, and the noise emphasizing processing; and
determining, respectively, the correction intensities of the noise correction processing conducted among the two-dimensional correction processing, the three-dimensional correction processing, and the edge emphasizing processing.

28. The method according to claim 17, further comprising:
performing, by an imaging unit, an imaging operation to create an image signal to output the image signal therefrom;
detecting an exposure quantity of the imaging unit; and
controlling, by an exposure control unit, the exposure of the imaging unit based on the detected exposure quantity,
wherein the value of the noise correction intensity is adjusted using the signal extension degree, and an exposure control degree in the exposure control unit.

29. The method according to claim 26, further comprising:
performing, by an imaging unit, an imaging operation to create an image signal to output the image signal therefrom;
detecting an exposure quantity of the imaging unit; and
controlling, by an exposure control unit, the exposure of the imaging unit based on the detected exposure quantity;
conducting, in the two-dimensional correction processing, signal processing in which a degree of the correlation of a signal level between a pixel in consideration in the image signal is compared with a reference value and the presence or absence of noise correction for the pixel in consideration is determined or a type of a correction method is changed; and
controlling the reference value by use of an exposure control degree in the exposure control unit, and determining the noise correction intensity by use of the signal extension degree and the exposure control degree.

30. The method according to claim 26, further comprising:
performing, by an imaging unit, an imaging operation to create an image signal to output the image signal therefrom;
detecting an exposure quantity of the imaging unit; and
controlling exposure of the imaging unit based on the detected exposure quantity;
conducting, in the three-dimensional correction processing, signal processing in which a degree of the correlation of a signal level of a pixel in consideration between images successive in a time axis or a degree of the correlation of a signal level between a pixel in consideration in the image signal is compared with a reference value and the presence or absence of noise correction for the pixel in consideration is determined or a type of a correction method is changed; and
controlling the reference value by use of the exposure control degree in the exposure control unit, and determining the noise correction intensity by use of the signal extension degree and the exposure control degree.

31. The method according to claim 17, further comprising:
performing, by an imaging unit, an imaging operation to create an image signal to output the image signal therefrom;
detecting an exposure quantity of the imaging unit;
controlling, by an exposure control unit, the exposure of the imaging unit based on the detected exposure quantity; and
determining the signal level correction intensity using an exposure control degree in the exposure control unit.

32. The method according to claim 31, further comprising reducing the signal level correction intensity in a case that the exposure control is conducted so as to make a signal gain large.

* * * * *